United States Patent
Ono et al.

(10) Patent No.: US 11,980,224 B2
(45) Date of Patent: May 14, 2024

(54) POWER SUPPLY UNIT FOR AEROSOL GENERATION DEVICE

(71) Applicant: Japan Tobacco Inc., Tokyo (JP)

(72) Inventors: Yasuhiro Ono, Tokyo (JP); Minoru Kitahara, Tokyo (JP); Shujiro Tanaka, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 377 days.

(21) Appl. No.: 17/371,101

(22) Filed: Jul. 9, 2021

(65) Prior Publication Data

US 2022/0007718 A1    Jan. 13, 2022

(30) Foreign Application Priority Data

Jul. 9, 2020    (JP) .................... 2020-118740

(51) Int. Cl.
*A24F 40/40*    (2020.01)
*A24F 40/50*    (2020.01)
*A24F 40/90*    (2020.01)

(52) U.S. Cl.
CPC .............. *A24F 40/40* (2020.01); *A24F 40/50* (2020.01); *A24F 40/90* (2020.01)

(58) Field of Classification Search
CPC .......... A24F 40/40; A24F 40/50; A24F 40/90; A61M 2205/8237; H02J 7/0044
See application file for complete search history.

(56) References Cited

U.S. PATENT DOCUMENTS

| | | | |
|---|---|---|---|
| 9,078,472 B2 * | 7/2015 | Liu | A24F 40/40 |
| 11,638,443 B2 * | 5/2023 | Fu | H05B 1/0244 |
| | | | 219/494 |
| 2018/0132529 A1 | 5/2018 | Sur et al. | |
| 2018/0301915 A1 | 10/2018 | Colotte et al. | |
| 2019/0364968 A1 | 12/2019 | Fu et al. | |
| 2019/0380388 A1 | 12/2019 | Amorde et al. | |

FOREIGN PATENT DOCUMENTS

| | | |
|---|---|---|
| CN | 106099464 A | 11/2016 |
| CN | 207572680 U | 7/2018 |
| JP | 2010-260695 A | 11/2010 |
| JP | 2017-538410 A | 12/2017 |
| JP | 2020-504599 A | 2/2020 |
| JP | 2020-517258 A | 6/2020 |
| WO | 2016/090303 A1 | 6/2016 |

OTHER PUBLICATIONS

Mouser Electronics—www.mouser.com Part # USB 4105 GF-A-060 Technical Drawing Oct. 4, 2019 (Year: 2019).*
Notice of Reasons for Refusal dated Oct. 27, 2020, received for JP Application 2020-118740, 5 pages including English Translation.
European Search Report dated Dec. 14, 2021 in European Patent Application No. 21184485.7, 4 pages.

* cited by examiner

Primary Examiner — Vanessa Girardi
(74) Attorney, Agent, or Firm — XSENSUS LLP

(57) ABSTRACT

A power supply unit for an aerosol generation device includes: a power supply configured to supply power to a heater configured to heat an aerosol source; a receptacle configured to allow insertion of a plug including a plurality of pins and configured to receive power for charging the power supply from the inserted plug; and a charger configured to control charging of the power supply by power received by the receptacle. The receptacle includes pins connectable to only some of pins among the plurality of pins.

9 Claims, 10 Drawing Sheets

POWER SUPPLY UNIT FOR AEROSOL GENERATION DEVICE

CROSS-REFERENCE TO RELATED APPLICATION

This application is based upon and claims the benefit of priority from prior Japanese patent application No. 2020-118740, filed on Jul. 9, 2020, the entire contents of which are incorporated herein by reference.

TECHNICAL FIELD

The present invention relates to a power supply unit for an aerosol generation device.

BACKGROUND ART

Patent Literature 1 discloses a technology in which a control main body of an aerosol delivery device can be connected to a computer via a universal serial bus (USB) cable and a connector (for example, USB 2.0, 3.0, 3.1, USB Type-C). Patent Literatures 2 and 3 also disclose a technology in which a USB (for example, USB Type-C) cable can be connected to an apparatus that generates an aerosol.

[Patent Literature 1] JP-T-2020-504599
[Patent Literature 2] JP-T-2017-538410
[Patent Literature 3] US 2019/0380388 A1

Since an aerosol generation device is carried by a user and used by a hand, it has been desired that the aerosol generation device is as small as possible and can be charged at various locations (places). However, in the related art, there is room for improvement from a viewpoint of miniaturizing the aerosol generation device while securing many opportunities for charging the aerosol generation device.

SUMMARY OF INVENTION

The present invention provides a power supply unit for an aerosol generation device that can miniaturize the aerosol generation device while securing many opportunities for charging the aerosol generation device.

According to an aspect of the invention, there is provided a power supply unit for an aerosol generation device including: a power supply configured to supply power to a heater configured to heat an aerosol source; a receptacle configured to allow insertion of a plug including a plurality of pins and configured to receive power for charging the power supply from the inserted plug; and a charger configured to control charging of the power supply by power received by the receptacle, wherein the receptacle includes pins connectable to only some of pins among the plurality of pins.

According to the present invention, it is possible to provide a power supply unit for an aerosol generation device that can miniaturize the aerosol generation device while securing an opportunity for charging the aerosol generation device.

DESCRIPTION OF EMBODIMENTS

Hereinafter, a power supply unit for an aerosol generation device according to an embodiment of the present invention will be described. First, an aerosol inhaler, which is an example of the aerosol generation device including the power supply unit of the present embodiment, will be described with reference to FIGS. 1 to 3.

(Aerosol Inhaler)

An aerosol inhaler 1 is an instrument for generating an aerosol to which a flavor is added without burning and sucking the generated aerosol, preferably has a size that fits in a hand, and has a substantially rectangular parallelepiped shape. The aerosol inhaler 1 may have an ovoid shape, an elliptical shape, or the like. In the following description, regarding the aerosol inhaler having the substantially rectangular parallelepiped shape, three orthogonal directions will be referred to as an upper-lower direction, a front-rear direction, and a left-right direction in descending order of length. Further, in the following description, for convenience, as shown in FIGS. 1 to 3, a front side, a rear side, a left side, a right side, an upper side, and a lower side are defined, and the front side is shown as Fr, the rear side is shown as Rr, the left side is shown as L, the right side is shown as R, the upper side is shown as U, and the lower side is shown as D.

Figure 1:
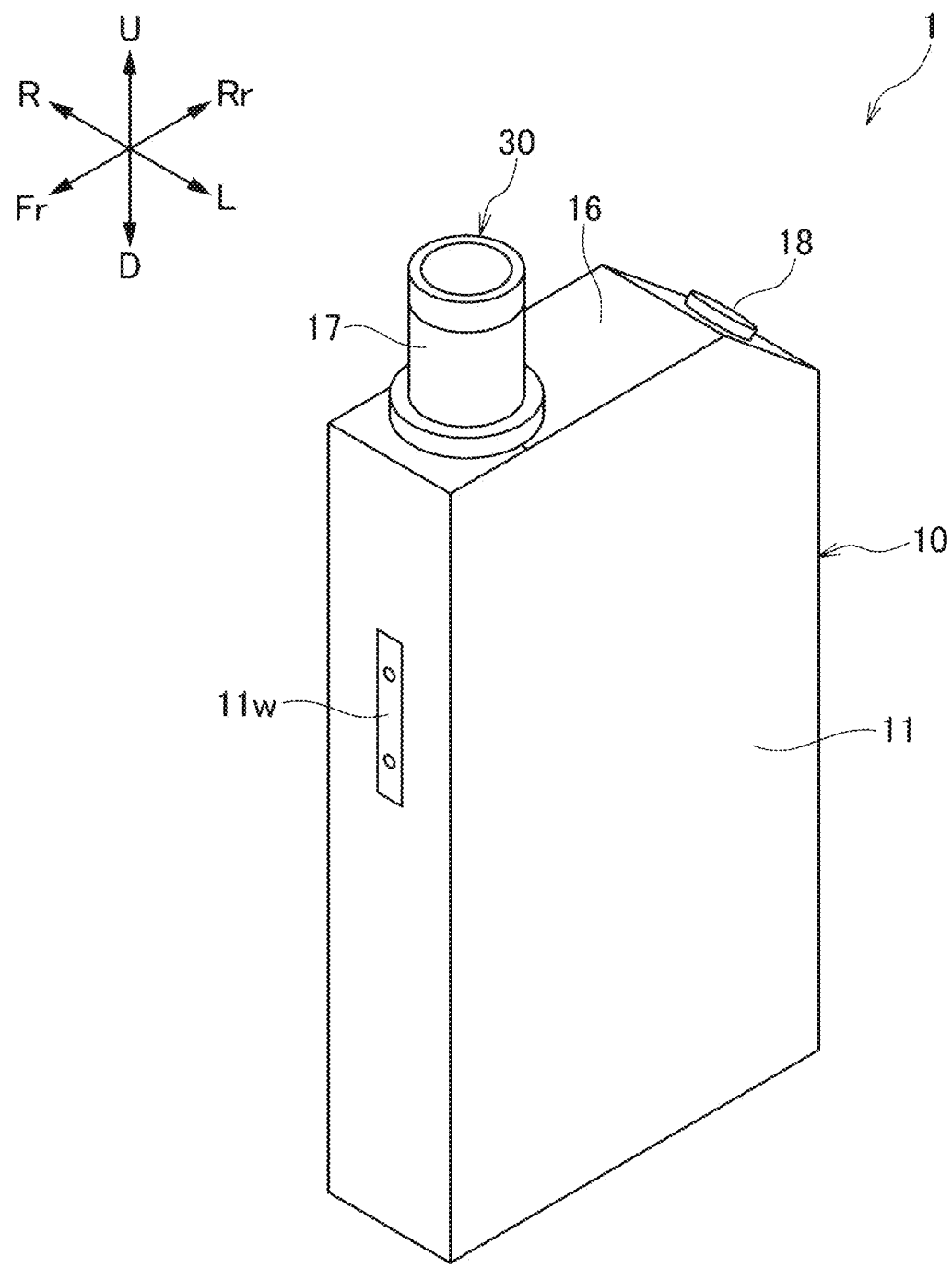
FIG. 1 is a perspective view of an aerosol inhaler according to an embodiment of the present invention.
Figure 2:
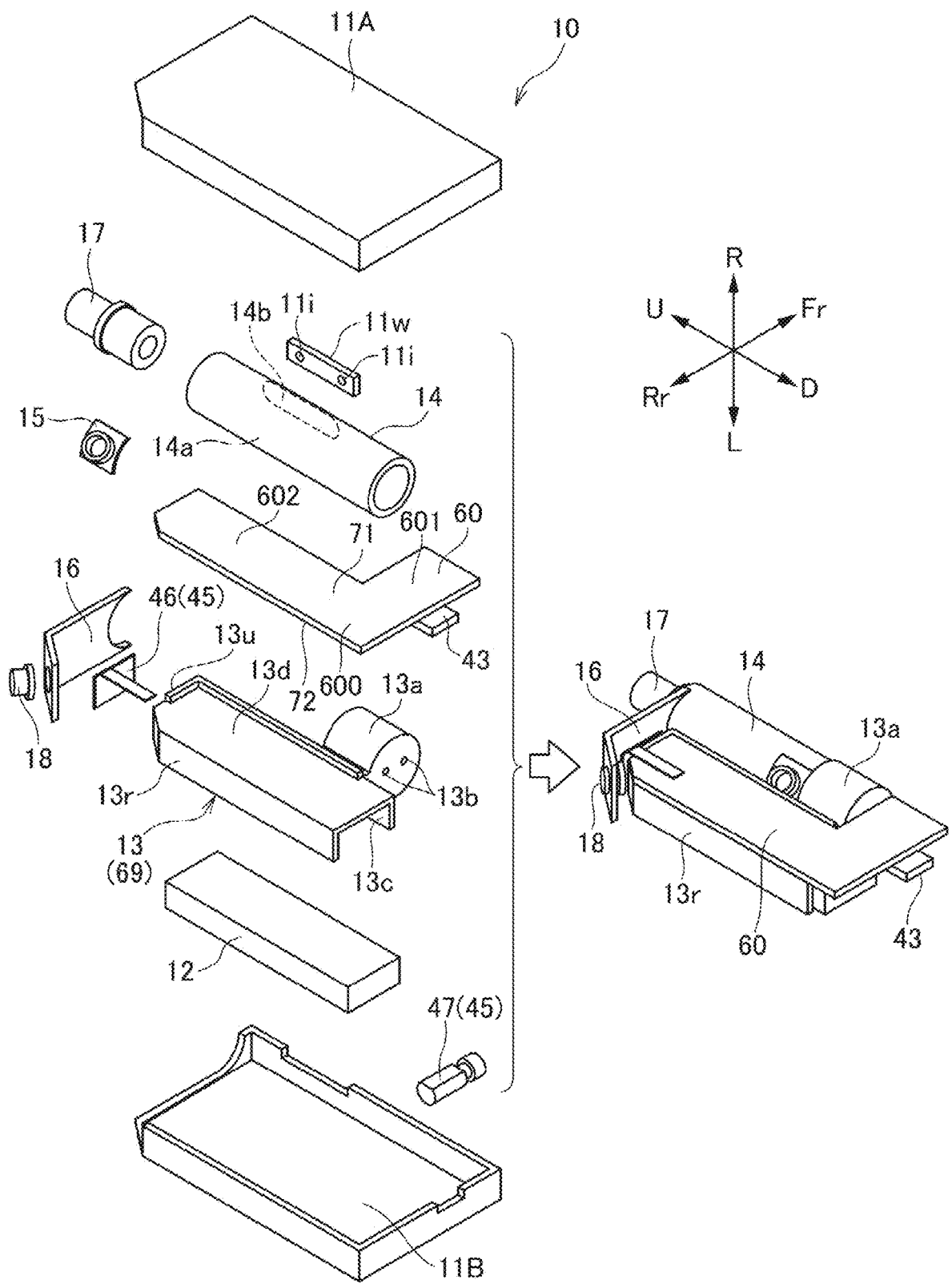
FIG. 2 is an exploded perspective view of the aerosol inhaler of FIG. 1.
Figure 3:
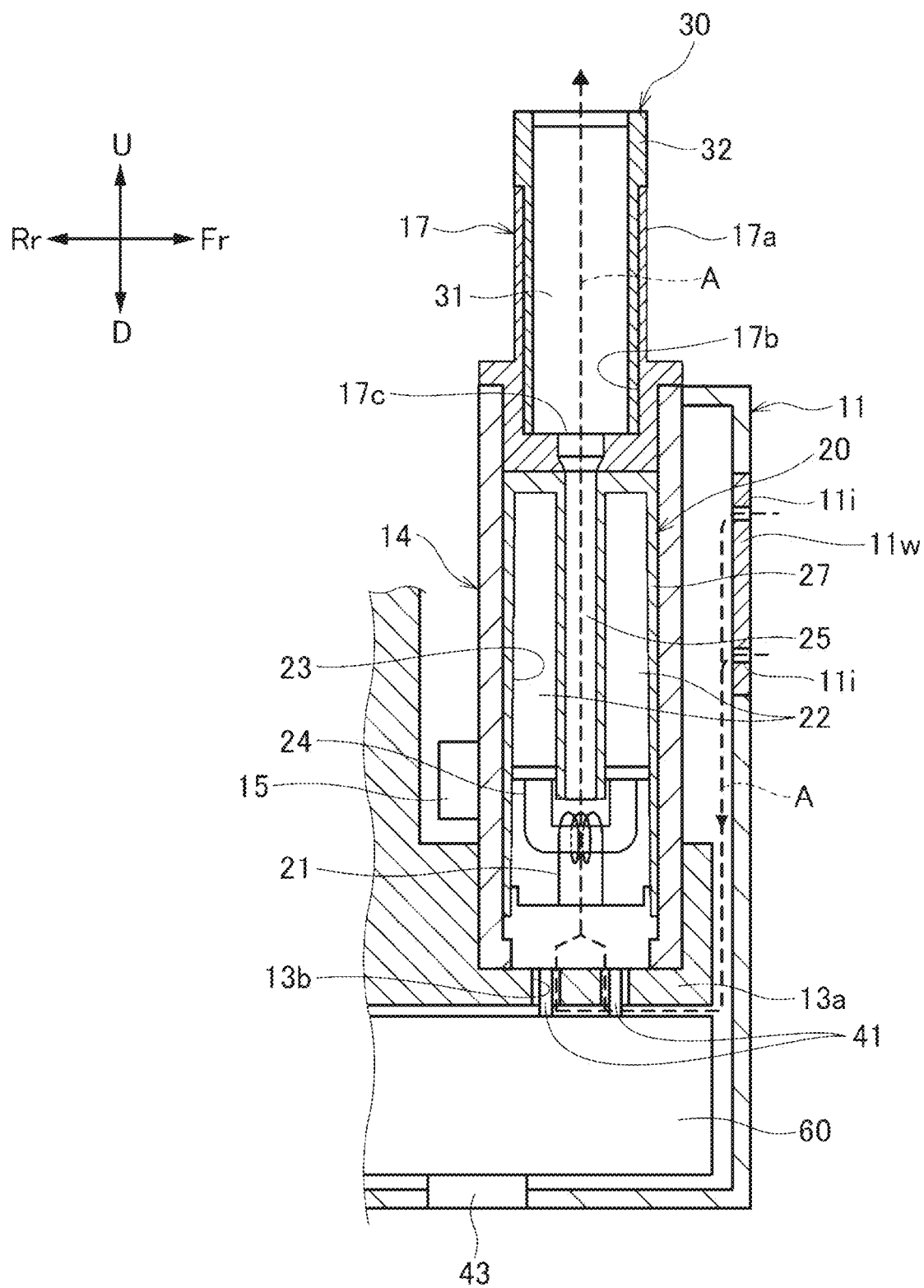
FIG. 3 is a cross-sectional view of the aerosol inhaler of FIG. 1.

As shown in FIGS. 1 to 3, the aerosol inhaler 1 includes a power supply unit 10, a first cartridge 20, and a second cartridge 30. The first cartridge 20 and the second cartridge 30 are attachable to and detachable from the power supply unit 10. In other words, the first cartridge 20 and the second cartridge 30 are replaceable.

(Power Supply Unit)

As shown in FIGS. 1 and 2, the power supply unit 10 houses various sensors and the like such as a power supply 12, an internal holder 13, a circuit board 60, and an intake sensor 15 inside a power supply unit case 11 having a substantially rectangular parallelepiped shape (hereinafter, also referred to as an inside of the case). The power supply 12, the circuit board 60 (including an MCU 50, a discharging terminal 41, a charging terminal 43, and the like, which will be described later), and the like are collectively housed in the power supply unit case 11, so that carrying by a user can be facilitated and user convenience can be improved.

The power supply unit case 11 is configured with a first case 11A and a second case 11B that are attachable and detachable in the left-right direction (thickness direction), and the first case 11A and the second case 11B are assembled in the left-right direction (thickness direction), so that a front surface, a rear surface, a left surface, a right surface, and a lower surface of the power supply unit 10 are formed. An upper surface of the power supply unit 10 is formed by a display 16.

A mouthpiece 17 is provided in the upper surface of the power supply unit 10 in front of the display 16. In the mouthpiece 17, a suction port 17a protrudes further upward than the display 16.

An inclined surface inclined downward toward the rear side is provided between the upper surface and the rear surface of the power supply unit 10. An operation unit 18 that can be operated by the user is provided on the inclined surface. The operation unit 18 is configured with a button-type switch, a touch panel, and the like, and is used when activating or interrupting the MCU 50 and various sensors by reflecting a use intention of the user, or the like.

The charging terminal 43, which can be electrically connected to an external power supply (not shown) that can supply power for charging the power supply 12 to the power supply unit 10, is provided on the lower surface of the power supply unit 10. The charging terminal 43 is, for example, a receptacle into which a mating plug (described later) can be inserted. As the charging terminal 43, a receptacle into which various USB terminals (plugs) or the like can be inserted can be used. As an example, in the present embodiment, the charging terminal 43 is a USB Type-C shaped receptacle. Accordingly, it is possible to facilitate charging of the power supply unit 10 (that is, the aerosol inhaler 1) at various locations (places) and secure an opportunity capable of charging the power supply unit 10.

The charging terminal 43 may include, for example, a power reception coil, and may be configured to be able to receive power transmitted from the external power supply in a non-contact manner. A wireless power transfer method in this case may be an electromagnetic induction type, a magnetic resonance type, or a combination of the electromagnetic induction type and the magnetic resonance type. As another example, the charging terminal 43 can be connected to various USB terminals or the like and may include the power reception coil described above.

The internal holder 13 includes a rear wall 13r that extends along the rear surface of the power supply unit 10, a central wall 13c that is provided at a central portion in the front-rear direction inside the case and extends parallel to the rear wall 13r, an upper wall 13u that extends along the display 16 and couples the rear wall 13r to the central wall 13c, a partition wall 13d that is orthogonal to the rear wall 13r, the central wall 13c, and the upper wall 13u and divides a space partitioned and formed by the rear wall 13r, the central wall 13c, and the upper wall 13u into a left side space and a right side space, and a cartridge holding portion 13a coupled to the central wall 13c and positioned in front of the central wall 13c and above the lower surface of the power supply unit 10.

The power supply 12 is disposed in the left side space of the internal holder 13. The power supply 12 is a rechargeable secondary battery, an electric double-layer capacitor, or the like, and is preferably a lithium-ion secondary battery. An electrolyte of the power supply 12 may be one of or a combination of a gel-like electrolyte, an electrolytic solution, a solid electrolyte, and an ionic liquid.

The substantially L-shaped circuit board 60 is disposed in a space formed by the right side space of the internal holder 13 and a lower side space formed between the cartridge holding portion 13a and the lower surface of the power supply unit 10. The circuit board 60 has the substantially L shape, so that other components can be arranged in a cutout portion of the circuit board 60. Therefore, the power supply unit 10 and the aerosol inhaler 1 can be miniaturized. In the present embodiment, as shown in FIGS. 2 and 3, the first cartridge 20 (that is, an aerosol source 22 and a load 21 that will be described later), a cartridge holder 14 that holds the first cartridge 20, and the like are arranged in the cutout portion of the substantially L-shaped circuit board 60. That is, the power supply unit case 11 houses the first cartridge 20 and the like in a state where the first cartridge 20 and the like are arranged in the cutout portion of the L-shaped circuit board 60. Accordingly, the aerosol inhaler 1 can be miniaturized, and for example, the aerosol inhaler 1 having the size that fits in a hand of a general adult can be implemented.

The circuit board 60 is configured by stacking a plurality of layers (four layers in the present embodiment) of boards, and electronic components (elements) such as the micro controller unit (MCU) 50 and a charging IC 55, which will be described later, are mounted on the circuit board 60.

Although details will be described later with reference to FIG. 5 and the like, the MCU 50 is a control device (a controller) that is connected to various sensor devices such as the intake sensor 15 that detects a puff (intake) operation, the operation unit 18, a notification unit 45, a memory 19 that stores number of times of puff operations, an energization time to the load 21, or the like, and the like, and that performs various controls of the aerosol inhaler 1. Specifically, the MCU 50 is mainly configured with a processor, and further includes a storage medium such as a random access memory (RAM) required for an operation of the processor and a read only memory (ROM) that stores various pieces of information. The processor in the present description is, for example, an electric circuit in which circuit elements such as semiconductor elements are combined. Some of the elements (for example, the intake sensor 15 and the memory 19) connected to the MCU 50 in FIG. 5 may be provided inside the MCU 50 as a function of the MCU 50 itself.

The charging IC 55 is an integrated circuit (IC) that controls charging of the power supply 12 by power input from the charging terminal 43 and that supplies power of the power supply 12 to the electronic components and the like of the circuit board 60.

A cylindrical cartridge holder 14 that holds the first cartridge 20 is disposed at the cartridge holding portion 13a.

A through hole 13b, which receives the discharging terminal 41 (see FIG. 3) provided so as to protrude from the circuit board 60 toward the first cartridge 20, is provided in a lower end portion of the cartridge holding portion 13a. The discharging terminal 41 is a connector that electrically connects the load 21 provided in the first cartridge 20. Further, the discharging terminal 41 is a connector that removably (or easily removably) connects the load 21, and is configured with, for example, a pin or the like in which a spring is built. The discharging terminal 41 is an example of a second connector in the present invention.

The through hole 13b is larger than the discharging terminal 41, and is configured such that air flows into an inside of the first cartridge 20 via a gap formed between the through hole 13b and the discharging terminal 41.

The intake sensor 15 that detects a puff operation is provided on an outer peripheral surface 14a of the cartridge holder 14 at a position facing the circuit board 60. The intake sensor 15 may be configured with a condenser microphone, a pressure sensor, or the like. Further, the cartridge holder 14 is provided with a hole portion 14b that is long in the upper-lower direction and through which a remaining amount of the aerosol source 22 stored inside the first cartridge 20 can be visually checked, and is configured such that the user can visually check the remaining amount of the aerosol source 22 stored inside the first cartridge 20 through the hole portion 14b of the first cartridge 20 from a remaining amount check window 11w that has light-transmissive properties and is provided in the power supply unit case 11.

As shown in FIG. 3, the mouthpiece 17 is detachably fixed to an upper end portion of the cartridge holder 14. The second cartridge 30 is detachably fixed to the mouthpiece 17. The mouthpiece 17 includes a cartridge housing portion 17b that houses a part of the second cartridge 30, and a communication path 17c that allows the first cartridge 20 and the cartridge housing portion 17b to communicate with each other.

The power supply unit case 11 is provided with air intake ports 11i that take in outside air inside. The air intake port 11i is provided in, for example, the remaining amount check window 11w.

(First Cartridge)

As shown in FIG. 3, the first cartridge 20 includes, inside a cylindrical cartridge case 27, a reservoir 23 that stores the aerosol source 22, an electrical load 21 that atomizes the aerosol source 22, a wick 24 that draws the aerosol source from the reservoir 23 to the load 21, and an aerosol flow path 25 through which an aerosol generated by atomizing the aerosol source 22 flows toward the second cartridge 30.

The reservoir 23 is partitioned and formed so as to surround a periphery of the aerosol flow path 25, and stores the aerosol source 22. The reservoir 23 may house a porous body such as a resin web or cotton, and the aerosol source 22 may be impregnated with the porous body. The reservoir 23 may store only the aerosol source 22 without housing the porous body on the resin web or the cotton. The aerosol source 22 contains a liquid such as glycerin, propylene glycol, or water.

The wick 24 is a liquid holding member that draws the aerosol source 22 from the reservoir 23 to the load 21 by using a capillary phenomenon. The wick 24 is made of, for example, glass fiber, porous ceramic, or the like.

The load 21 is a heat generation element (that is, a heater) that heats the aerosol source 22 without burning by power supplied from the power supply 12 via the discharging terminal 41, and is configured with, for example, an electric heating wire (a coil) wound at a predetermined pitch. The load 21 heats the aerosol source 22 to atomize the aerosol source 22. As the load 21, a heat generation resistor, a ceramic heater, an induction heating type heater, or the like can be used. The load 21 is an example of a heater and a second load in the present invention.

The aerosol flow path 25 is provided on a downstream side of the load 21 and on a center line of the first cartridge 20.

(Second Cartridge)

The second cartridge 30 stores a flavor source 31. The second cartridge 30 is detachably housed in the cartridge housing portion 17b provided in the mouthpiece 17.

The second cartridge 30 adds a flavor to an aerosol by passing the aerosol generated by atomizing the aerosol source 22 by the load 21 through the flavor source 31. As a raw material piece that constitutes the flavor source 31, chopped tobacco or a molded body obtained by molding a tobacco raw material into a granular shape can be used. The flavor source 31 may be formed of a plant other than the tobacco (for example, mint, Chinese herb or herb). A fragrance such as menthol may be added to the flavor source 31.

The aerosol inhaler 1 can generate (that is, produce) an aerosol to which a flavor is added by the aerosol source 22, the flavor source 31, and the load 21. That is, the aerosol source 22 and the flavor source 31 constitute an aerosol generation source that generates the aerosol to which the flavor is added.

The configuration of the aerosol generation source used for the aerosol inhaler 1 may be a configuration in which the aerosol source 22 and the flavor source 31 are integrally formed, a configuration in which the flavor source 31 is omitted and a substance that can be contained in the flavor source 31 is added to the aerosol source 22, a configuration in which a medicine or the like instead of the flavor source 31 is added to the aerosol source 22, or the like, in addition to the configuration in which the aerosol source 22 and the flavor source 31 are formed separately.

In the aerosol inhaler 1 configured as described above, as indicated by an arrow A in FIG. 3, air that flows in from the air intake ports 11i provided in the power supply unit case 11 passes through a vicinity of the load 21 of the first cartridge 20 via the gap formed between the through hole 13b and the discharging terminal 41. The load 21 atomizes the aerosol source 22 drawn from the reservoir 23 by the wick 24. The aerosol generated by atomization flows through the aerosol flow path 25 together with the air that flows in from the intake ports, and is supplied to the second cartridge 30 via the communication path 17c. The aerosol supplied to the second cartridge 30 is flavored by passing through the flavor source 31, and is supplied to a suction port 32.

Figure 5:
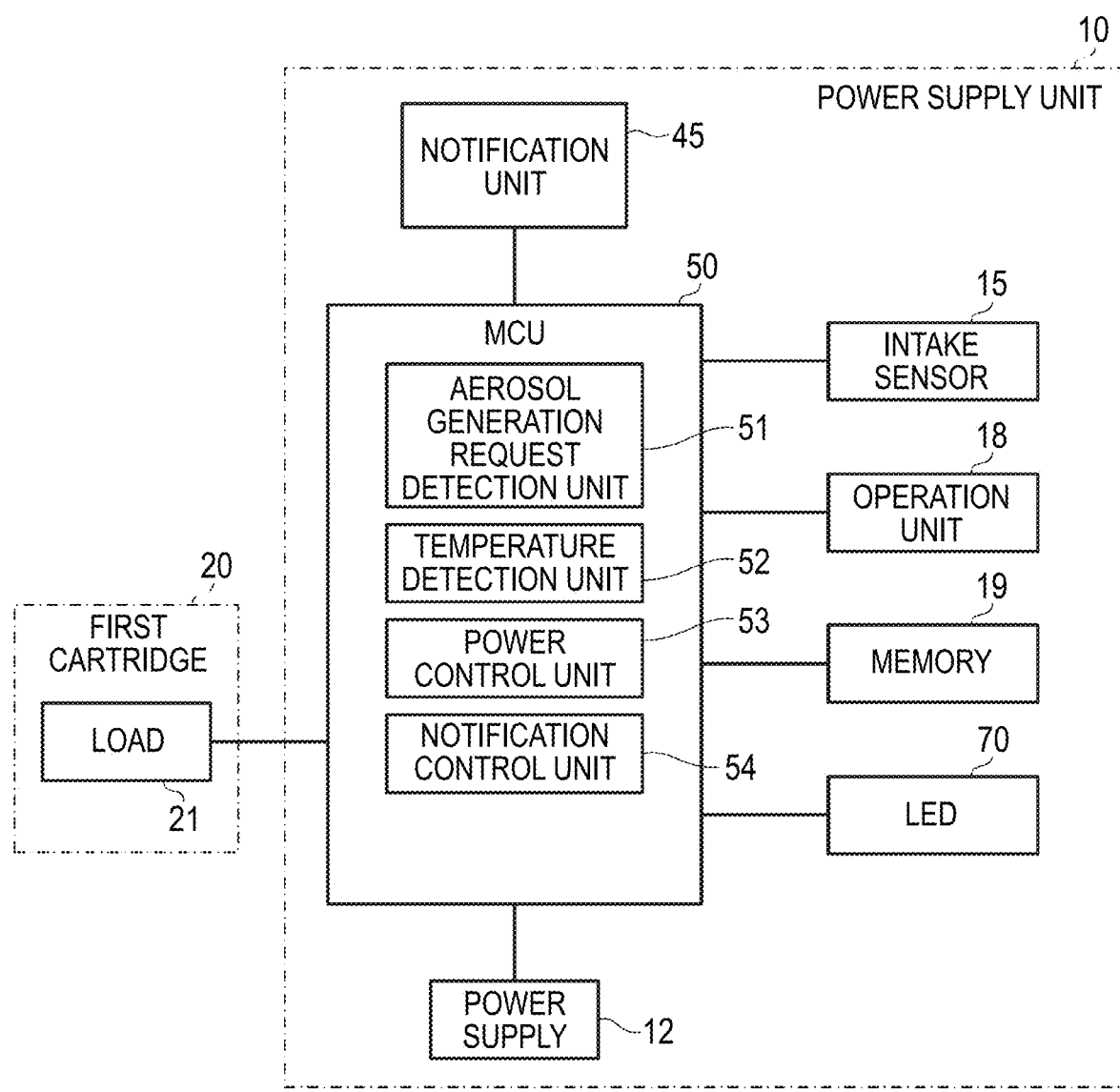
FIG. 5 is a block diagram showing a configuration of an MCU of the power supply unit in the aerosol inhaler of FIG. 1.

The aerosol inhaler 1 is provided with the notification unit 45 that notifies various pieces of information (see FIG. 5). The notification unit 45 may be configured with a light-emitting element, a vibration element, or a sound output element. Further, the notification unit 45 may be a combination of two or more elements among the light-emitting element, the vibration element, and the sound output element. The notification unit 45 may be provided in any one of the power supply unit 10, the first cartridge 20, and the second cartridge 30, but is preferably provided in the power supply unit 10 that is not a consumable item.

In the present embodiment, an organic light emitting diode (OLED) panel 46 and a vibrator 47 are provided as the notification unit 45. When an OLED of the OLED panel 46 emits light, various pieces of information on the aerosol inhaler 1 are notified to the user via the display 16. Further, the vibrator 47 vibrates, so that the user is notified of the various pieces of information on the aerosol inhaler 1 via the power supply unit case 11. The notification unit 45 may be provided with only one of the OLED panel 46 and the vibrator 47, or may be provided with another light-emitting element or the like. Further, information notified by the OLED panel 46 and information notified by the vibrator 47 may be different or the same.

(Electric Circuit)

Next, an electric circuit of the power supply unit 10 will be described with reference to FIG. 4.

Figure 4:
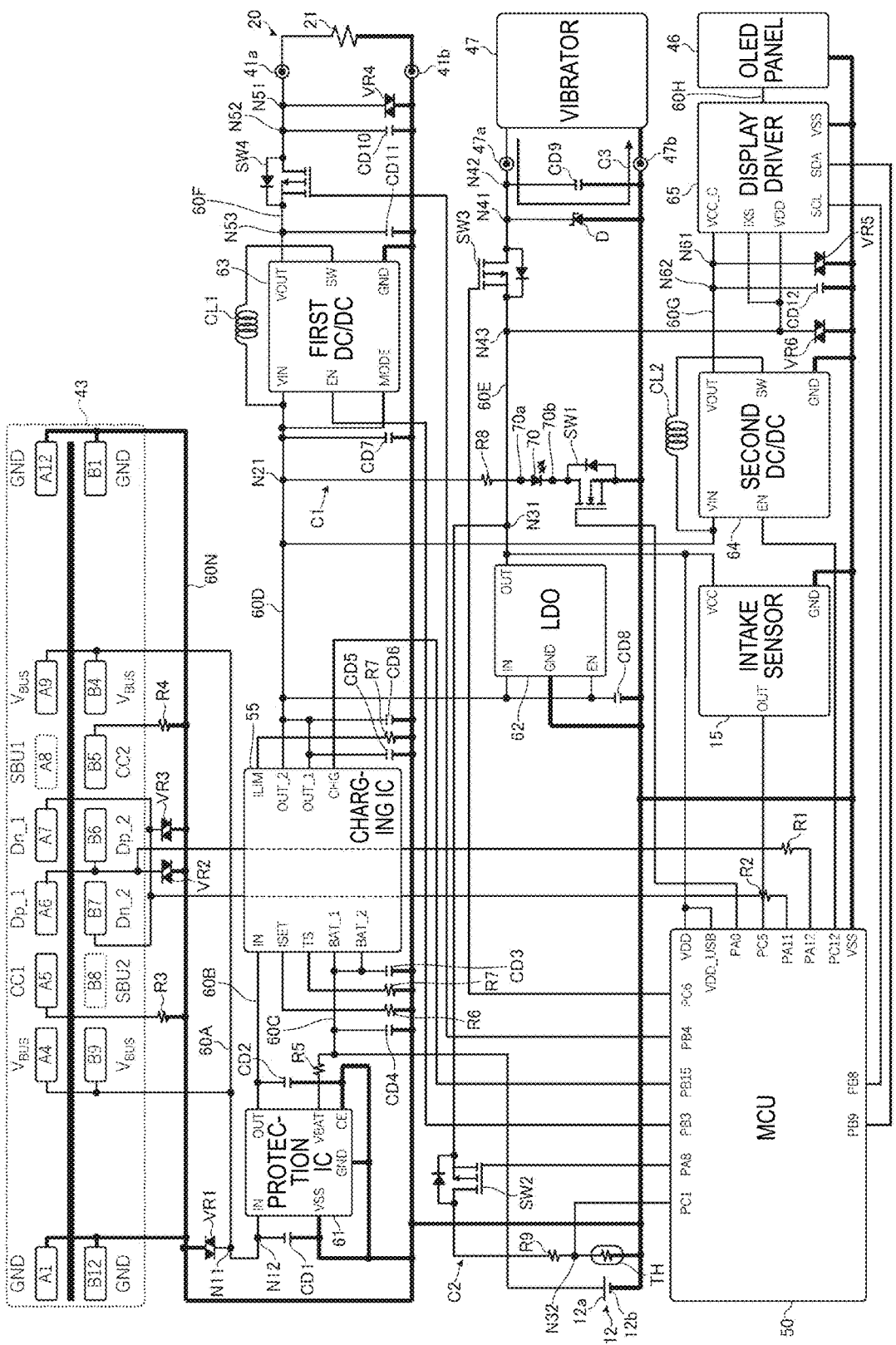
FIG. 4 is a diagram showing a circuit configuration of a power supply unit of the aerosol inhaler of FIG. 1.

As shown in FIG. 4, the power supply unit 10 includes, as main components, the power supply 12, the charging terminal 43, the MCU 50, the charging IC 55, a protection IC 61, an LDO regulator (indicated by "LDO" in FIG. 4) 62, a first DC/DC converter (indicated by "first DC/DC" in FIG. 4) 63, a second DC/DC converter (indicated by "second DC/DC" in FIG. 4) 64, a display driver 65, the intake sensor 15, the OLED panel 46, and the vibrator 47.

The charging terminal 43 is the receptacle into which the mating plug can be inserted as described above, and includes a plurality of pins (terminals) electrically connected to a pin of the inserted plug. Specifically, the charging terminal 43 includes an A1 pin (indicated by "A1" in FIG. 4), an A4 pin (indicated by "A4" in FIG. 4), an A5 pin (indicated by "A5" in FIG. 4), an A6 pin (indicated by "A6" in FIG. 4), an A7 pin (indicated by "A7" in FIG. 4), an A8 pin (indicated by "A8" in FIG. 4), an A9 pin (indicated by "A9" in FIG. 4), an A12 pin (indicated by "A12" in FIG. 4), a B1 pin (indicated by "B1" in FIG. 4), a B4 pin (indicated by "B4" in FIG. 4), a B5 pin (indicated by "B5" in FIG. 4), a B6 pin (indicated by "B6" in FIG. 4), a B7 pin (indicated by "B7" in FIG. 4), a B8 pin (indicated by "B8" in FIG. 4), a B9 pin (indicated by "B9" in FIG. 4), and a B12 pin (indicated by "B12" in FIG. 4).

The A1 pin, the A4 pin, the A5 pin, the A6 pin, the A7 pin, the A8 pin, the A9 pin, the A12 pin, the B1 pin, the B4 pin, the B5 pin, the B6 pin, the B7 pin, the B8 pin, the B9 pin, and the B12 pin are arranged so as to be point-symmetrical, with a center of a fitting surface with a plug of the charging terminal 43 as a point of symmetry. Accordingly, the plug can be inserted into the charging terminal 43 regardless of an upper-lower direction of the plug, and user convenience is improved.

It should be noted that, in the present embodiment, only main pins among pins provided in the charging terminal 43 are described. Further, in the present embodiment, the charging terminal 43 is provided with the A8 pin and the B8 pin, but as will be described later, these pins are not used and may be omitted.

The protection IC 61 is an IC having a function of converting a voltage input via the charging terminal 43 into a predetermined voltage as necessary and outputting the converted voltage. Specifically, the protection IC 61 converts the input voltage into a voltage included in a range from a minimum value to a maximum value of a recommended input voltage of the charging IC 55. Accordingly, even when a high voltage that exceeds the maximum value of the recommended input voltage of the charging IC 55 is input via the charging terminal 43, the protection IC 61 can protect the charging IC 55 from the high voltage.

As an example, in the present embodiment, the recommended input voltage of the charging IC 55 has a minimum value of 4.35 [V] and a maximum value of 6.4 [V]. Therefore, the protection IC 61 converts the input voltage into 5.5±0.2 [V], and outputs the converted voltage to the charging IC 55. Accordingly, the protection IC 61 can supply an appropriate voltage to the charging IC 55. Further, when the above-described high voltage is input via the charging terminal 43, the protection IC 61 may protect the charging IC 55 by opening a circuit that connects an input terminal (denoted by IN in FIG. 4) and an output terminal (denoted by OUT in FIG. 4) of the protection IC 61. In addition, the protection IC 61 may also have various protection functions (for example, an overcurrent detection function and an overvoltage detection function) for protecting the electric circuit of the power supply unit 10.

It is preferable that the protection IC 61 is connected between the charging terminal 43 and the charging IC 55, that is, is electrically provided between the charging terminal 43 and the charging IC 55. The protection IC 61 is connected between the charging terminal 43 and the charging IC 55, so that the power supply 12 can be discharged via the charging IC 55 without passing through the protection IC 61, and power loss due to passing through the protection IC 61 can be reduced.

The protection IC 61 includes a plurality of pins (terminals) for electrically connecting an inside and an outside of the protection IC 61. Specifically, the protection IC 61 includes an IN pin (indicated by "IN" in FIG. 4), a VSS pin (indicated by "VSS" in FIG. 4), a GND pin (indicated by "GND" in FIG. 4), an OUT pin (indicated by "OUT" in FIG. 4), a VBAT pin (indicated by "VBAT" in FIG. 4), and a CE pin (indicated by "CE" in FIG. 4).

In the protection IC 61, the IN pin is a pin to which power supplied from the charging terminal 43 is input. The VSS pin is a pin to which power for operating the protection IC 61 is input. The GND pin is a grounded pin. The OUT pin is a pin that outputs power to the charging IC 55. The VBAT pin is a pin for the protection IC 61 to detect a state of the power supply 12. The CE pin is a pin for switching the protection function of the protection IC 61 on/off. A connection relationship of these pins will be described later. It should be noted that, in the present embodiment, only main pins among pins provided in the protection IC 61 are described.

The charging IC 55 is an IC having a function of controlling charging to the power supply 12 and a function of supplying the power of the power supply 12 to the LDO regulator 62, the first DC/DC converter 63, the second DC/DC converter 64, and the like. For example, when supplying the power of the power supply 12, the charging IC 55 outputs a standard system voltage corresponding to an output of the power supply 12 at that time to the LDO regulator 62, the first DC/DC converter 63, the second DC/DC converter 64, and the like. Here, the standard system voltage is a voltage higher than a low-voltage system voltage described later and lower than a first high-voltage system voltage and a second high-voltage system voltage. The standard system voltage is, for example, an output voltage of the power supply 12 itself, and can be a voltage of about 3 to 4 [V].

The charging IC 55 also has a power-path function of supplying power input via the charging terminal 43 to the LDO regulator 62, the first DC/DC converter 63, the second DC/DC converter 64, and the like.

When the power-path function is used, even when the power supply 12 is being charged, power input via the charging terminal 43 can be supplied to a system of the power supply unit 10, such as the LDO regulator 62, the first DC/DC converter 63, and the second DC/DC converter 64. Therefore, when the system of the power supply unit 10 is used while charging the power supply 12, the system of the power supply unit 10 can be used while reducing a burden on the power supply 12 (that is, preventing deterioration of the power supply 12). At the same time, it is also possible to improve a charging speed of the power supply 12 and shorten a charging time. Further, when the power-path function is used, even when the power supply 12 is overdischarged, it is possible to recover the system of the power supply unit 10 by using power input via the charging terminal 43.

The charging IC 55 includes a plurality of pins (terminals) for electrically connecting an inside and an outside of the charging IC 55. Specifically, the charging IC 55 includes an IN pin (indicated by "IN" in FIG. 4), a BAT_1 pin (indicated by "BAT_1" in FIG. 4), a BAT_2 pin (indicated by "BAT_2" in FIG. 4), an ISET pin (indicated by "ISET" in FIG. 4), a TS pin (indicated by "TS" in FIG. 4), an OUT_1 pin (indicated by "OUT_1" in FIG. 4), an OUT_2 pin (indicated by "OUT_2" in FIG. 4), an ILIM pin (indicated by "ILIM" in FIG. 4), and a CHG pin (indicated by "CHG" in FIG. 4).

It should be noted that, in the present embodiment, only main pins among pins provided in the charging IC 55 are described. Further, in the present embodiment, the charging IC 55 is provided with the BAT_1 pin and the BAT_2 pin, but the BAT_1 pin and the BAT_2 pin may be combined as one pin. Similarly, in the present embodiment, the charging IC 55 is provided with the OUT_1 pin and the OUT_2 pin, but the OUT_1 pin and the OUT_2 pin may be combined as one pin.

The LDO regulator 62 is an IC having a function of generating a low-voltage system voltage from an input standard system voltage and outputting the generated low-voltage system voltage. Here, the low-voltage system voltage is a voltage lower than the standard system voltage as described above, and is, for example, a voltage suitable for operating the MCU 50, the intake sensor 15, and the like. An example of the low-voltage system voltage is 2.5 [V].

The LDO regulator 62 includes a plurality of pins (terminals) for electrically connecting an inside and an outside of the LDO regulator 62. Specifically, the LDO regulator 62 includes an IN pin (indicated by "IN" in FIG. 4), a GND pin (indicated by "GND" in FIG. 4), an OUT pin (indicated by "OUT" in FIG. 4), and an EN pin (indicated by "EN" in FIG. 4). It should be noted that, in the present embodiment, only main pins among pins provided in the LDO regulator 62 are described.

The MCU 50 operates using the input low-voltage system voltage as a power supply, and performs various controls of the aerosol inhaler 1. For example, the MCU 50 can control heating of the load 21 by controlling on/off of a switch SW4 described later and provided in the electric circuit of the power supply unit 10 and an operation of the first DC/DC converter 63. Further, the MCU 50 can control a display of the display 16 by controlling an operation of the display driver 65. Furthermore, the MCU 50 can control vibration of the vibrator 47 by controlling on/off of a switch SW3 described later and provided in the electric circuit of the power supply unit 10.

The MCU 50 includes a plurality of pins (terminals) for electrically connecting an inside and an outside of the MCU 50. Specifically, the MCU 50 includes a VDD pin (indicated by "VDD" in FIG. 4), a VDD_USB pin (indicated by "VDD_USB" in FIG. 4), a VSS pin (indicated by "VSS" in FIG. 4), a PC1 pin (indicated by "PC1" in FIG. 4), a PA8 pin (indicated by "PA8" in FIG. 4), a PB3 pin (indicated by "PB3" in FIG. 4), a PB15 pin (indicated by "PB15" in FIG. 4), a PB4 pin (indicated by "PB4" in FIG. 4), a PC6 pin (indicated by "PC6" in FIG. 4), a PA0 pin (indicated by "PA0" in FIG. 4), a PC5 pin (indicated by "PC5" in FIG. 4), a PA11 pin (indicated by "PA11" in FIG. 4), a PA12 pin (indicated by "PA12" in FIG. 4), a PC12 pin (indicated by "PC12" in FIG. 4), a PB8 pin (indicated by "PB8" in FIG. 4), and a PB9 pin (indicated by "PB9" in FIG. 4).

It should be noted that, in the present embodiment, only main pins among pins provided in the MCU 50 are described. Further, in the present embodiment, the MCU 50 is provided with the VDD pin and the VDD_USB pin, but the VDD pin and the VDD_USB pin may be combined as one pin.

The intake sensor 15 is a sensor device that detects a puff operation as described above, and is, for example, a sensor device configured to output a signal indicating a value of a change in a pressure (an internal pressure) in the power supply unit 10 caused by suction of the user through the suction port 32 as a detection result as will be described later.

The intake sensor 15 includes a plurality of pins (terminals) for electrically connecting an inside and an outside of the intake sensor 15. Specifically, the intake sensor 15 includes a VCC pin (indicated by "VCC" in FIG. 4), a GND pin (indicated by "GND" in FIG. 4), and an OUT pin (indicated by "OUT" in FIG. 4). It should be noted that, in the present embodiment, only main pins among pins provided in the intake sensor 15 are described.

The vibrator 47 is provided in a state of being connected to a positive electrode side terminal 47a provided on a power supply line 60E and to a negative electrode side terminal 47b provided on a ground line 60N to be described later, and includes a motor (not shown) that rotates a rotation shaft according to a voltage input via the positive electrode side terminal 47a and the negative electrode side terminal 47b, and an eccentric weight (not shown) attached to the rotation shaft of the motor. When a voltage (for example, a low-voltage system voltage) is input to the vibrator 47 via the positive electrode side terminal 47a and the negative electrode side terminal 47b, the motor and the eccentric weight are rotated to generate vibration.

In the present description, the term "positive electrode side" means a higher potential side than the "negative electrode side". That is, in the following description, the term "positive electrode side" may be read as "high potential side". Further, in the present description, the term "negative electrode side" means a lower potential side than the "positive electrode side". That is, in the following description, the term "negative electrode side" may be read as "low potential side".

The vibrator 47 is provided in a state of being attached to the power supply unit 10. The positive electrode side terminal 47a and the negative electrode side terminal 47b are connected to a terminal of the vibrator 47 by, for example, soldering. That is, the positive electrode side terminal 47a and the negative electrode side terminal 47b are connectors that connect the vibrator 47 such that the vibrator 47 is unremovable (or is difficult to be removed). The term unremovable (or difficult to be removed) refers to a mode in which the power supply unit 10 cannot be removed as long as the power supply unit 10 is assumed to be used.

The first DC/DC converter 63 is an IC having a function of generating a first high-voltage system voltage from an input standard system voltage and outputting the generated first high-voltage system voltage. Here, the first high-voltage system voltage is a voltage higher than the standard system voltage as described above. That is, the first DC/DC converter 63 boosts the input standard system voltage to the first high-voltage system voltage and outputs the first high-voltage system voltage. The first high-voltage system voltage is, for example, a voltage suitable for heating the load 21, and is 4.2 [V] as an example.

The first DC/DC converter 63 includes a plurality of pins (terminals) for electrically connecting an inside and an outside of the first DC/DC converter 63. Specifically, the first DC/DC converter 63 includes a VIN pin (indicated by "VIN" in FIG. 4), an SW pin (indicated by "SW" in FIG. 4), a GND pin (indicated by "GND" in FIG. 4), a VOUT pin (indicated by "VOUT" in FIG. 4), a MODE pin (indicated by "MODE" in FIG. 4), and an EN pin (indicated by "EN" in FIG. 4). It should be noted that, in the present embodiment, only main pins among pins provided in the first DC/DC converter 63 are described.

The second DC/DC converter 64 is an IC having a function of generating a second high-voltage system voltage from the input standard system voltage and outputting the generated second high-voltage system voltage. Here, the second high-voltage system voltage is a voltage higher than the standard system voltage as described above. That is, the second DC/DC converter 64 boosts the input standard system voltage to the second high-voltage system voltage and outputs the second high-voltage system voltage. Further, the second high-voltage system voltage is a voltage even higher than the first high-voltage system voltage, and is, for example, a voltage suitable for operating the OLED panel 46. An example of the second high-voltage system voltage is 15 [V].

The second DC/DC converter 64 includes a plurality of pins (terminals) for electrically connecting an inside and an outside of the second DC/DC converter 64. Specifically, the second DC/DC converter 64 includes a VIN pin (indicated by "VIN" in FIG. 4), an SW pin (indicated by "SW" in FIG. 4), a GND pin (indicated by "GND" in FIG. 4), a VOUT pin (indicated by "VOUT" in FIG. 4), and an EN pin (indicated by "EN" in FIG. 4). It should be noted that, in the present embodiment, only main pins among pins provided in the second DC/DC converter 64 are described.

The display driver 65 is an IC having a function of operating by using an input low-voltage system voltage as a power supply, and supplying a second high-voltage system voltage to the OLED panel 46 while controlling the OLED panel 46 so as to control a display of the display 16.

The display driver 65 includes a plurality of pins (terminals) for electrically connecting an inside and an outside of the display driver 65. Specifically, the display driver 65 includes a VDD pin (indicated by "VDD" in FIG. 4), a VSS pin (indicated by "VSS" in FIG. 4), a VCC_C pin (indicated by "VCC_C" in FIG. 4), an SDA pin (indicated by "SDA" in FIG. 4), an SCL pin (indicated by "SCL" in FIG. 4), and an IXS pin (indicated by "IXS" in FIG. 4). It should be noted that, in the present embodiment, only main pins among pins provided in the display driver 65 are described.

The components of the power supply unit 10 described above are electrically connected to one another by a lead wire or the like provided on the circuit board 60 of the power supply unit 10. Hereinafter, electrical connection of the components of the power supply unit 10 will be described in detail.

The A1 pin, the A12 pin, the B1 pin, and the B12 pin of the charging terminal 43 are ground pins. The A1 pin and the B12 pin are connected in parallel and grounded by the ground line 60N. Similarly, the A12 pin and the B1 pin are also connected in parallel and grounded by the ground line 60N. In FIG. 4, the ground line 60N (that is, a line having a potential of substantially 0 [V]) is indicated by a thick solid line.

The A4 pin, the A9 pin, the B4 pin, and the B9 pin of the charging terminal 43 are pins that receive an input of power from a plug of an external power supply inserted into the charging terminal 43 to the power supply unit 10. For example, when the plug is inserted into the charging terminal 43, predetermined USB bus power is supplied to the power supply unit 10 from the inserted plug via the A4 pin and the B9 pin, or the A9 pin and the B4 pin. Further, power corresponding to USB power delivery (USB PD) may be supplied to the power supply unit 10 from the plug of the external power supply inserted into the charging terminal 43.

Specifically, the A4 pin and the B9 pin are connected in parallel and connected to the IN pin of the protection IC 61 via the power supply line 60A. The IN pin of the protection IC 61 is a power supply pin of the protection IC 61 on a positive electrode side. Further, the A9 pin and the B4 pin are also connected in parallel, and connected to the IN pin of the protection IC 61 via the power supply line 60A.

The power supply line 60A is connected to the ground line 60N via a variable resistor (a nonlinear resistance element) VR1. Here, the variable resistor is an element that includes two terminals (electrodes), has a relatively high electric resistance value when a voltage between the two terminals is lower than a predetermined variable resistor voltage (for example, 27 [V] in a case of the present embodiment), and has a property in which the electric resistance value rapidly decreases when the voltage between the two terminals is equal to or higher than the variable resistor voltage.

Specifically, one end of the variable resistor VR1 is connected to a node N11 provided in the power supply line 60A, and the other end of the variable resistor VR1 is connected to the ground line 60N. Here, the node N11 is provided in the power supply line 60A on a protection IC 61 side with respect to a node connected to the A4 pin and the B9 pin and a node connected to the A9 pin and the B4 pin. Therefore, for example, even when static electricity is generated in the A4 pin, the A9 pin, the B4 pin, or the B9 pin due to friction between the charging terminal 43 and the plug when the plug is inserted into the charging terminal 43, the static electricity can be released to the ground line 60N via the variable resistor VR1 to protect the protection IC 61.

The power supply line 60A is connected to the ground line 60N via a capacitor CD1 that functions as a decoupling capacitor (also referred to as a bypass capacitor or a smoothing capacitor). Accordingly, a voltage input to the protection IC 61 via the power supply line 60A can be stabilized. Specifically, one end of the capacitor CD1 is connected to a node N12 provided in the power supply line 60A, and the other end of the capacitor CD1 is connected to the ground line 60N. Here, the node N12 is provided in the power supply line 60A on the protection IC 61 side with respect to the node N11. Therefore, even when static electricity is generated at the A4 pin, the A9 pin, the B4 pin, or the B9 pin, the variable resistor VR1 can protect the capacitor CD1 from the static electricity. That is, in the power supply line 60A, by providing the node N12 on the protection IC 61 side with respect to the node N11, it is possible to achieve both protection of the protection IC 61 from overvoltage and a stable operation of the protection IC 61.

The A6 pin, the A7 pin, the B6 pin, and the B7 pin of the charging terminal 43 are pins used for input and output of a signal for communication between the power supply unit 10 and an external apparatus (for example, an electronic apparatus described later). In the present embodiment, serial communication in which signals are transmitted differentially by two signal lines Dp (also referred to as D+) and Dn (also referred to as D−) is used for communication between the power supply unit 10 and the external apparatus.

The A6 pin and the B6 pin are pins corresponding to a signal line on a Dp side. The A6 pin and the B6 pin are connected in parallel, and are connected to the PA12 pin of the MCU 50 via a resistor R1. The resistor R1 is an element that is configured with a resistance element, a transistor, or the like and has a predetermined electric resistance value. Further, the PA12 pin of the MCU 50 is a pin used for input and output of a signal of the MCU 50. Therefore, a signal on the Dp side from the external apparatus can be input to the MCU 50 via the A6 pin or the B6 pin. Further, the signal on the Dp side from the MCU 50 can be output to the external apparatus via the A6 pin or the B6 pin.

The A6 pin and the B6 pin connected in parallel are also connected to the ground line 60N via a variable resistor VR2. That is, the variable resistor VR2 is connected in parallel to the A6 pin and the B6 pin connected in parallel. Therefore, for example, even when static electricity is generated in the A6 pin and the B6 pin due to the friction between the charging terminal 43 and the plug when the plug is inserted into the charging terminal 43, the static electricity can be released to the ground line 60N via the variable resistor VR2 to protect the MCU 50. Further, since the resistor R1 is provided between the pins A6 and B6 and the MCU 50, the resistor R1 can also prevent input of a high voltage to the MCU 50 and protect the MCU 50.

The A7 pin and the B7 pin are pins corresponding to a signal line on a Dn side. The A7 pin and the B7 pin are connected in parallel and connected to the PA11 pin of the MCU 50 via a resistor R2. The resistor R2 is an element that is configured with a resistance element, a transistor, or the like and has a predetermined electric resistance value. Further, the PA11 pin of the MCU 50 is a pin used for input and output of a signal of the MCU 50. Therefore, a signal on the Dn side from the external apparatus can be input to the MCU 50 via the A7 pin or the B7 pin. Further, a signal on the Dn side from the MCU 50 can be output to the external apparatus via the A7 pin or the B7 pin.

The A7 pin and the B7 pin connected in parallel are also connected to the ground line 60N via a variable resistor VR3. That is, the variable resistor VR3 is connected in parallel to the A7 pin and the B7 pin connected in parallel. Therefore, for example, even when static electricity is generated in the A7 pin or the B7 pin due to the friction between the charging terminal 43 and the plug when the plug is inserted into the charging terminal 43, the static electricity can be released to the ground line 60N via the variable resistor VR3 to protect the MCU 50. Further, since the resistor R2 is provided between the pins A7 and B7 and the MCU 50, the resistor R2 can also prevent input of a high voltage to the MCU 50 and protect the MCU 50.

The A5 pin and the B5 pin of the charging terminal 43 are pins used to detect an upper-lower direction of the plug inserted into the charging terminal 43. For example, the A5 pin and the B5 pin are configuration channel (CC) pins. The A5 pin is connected to the ground line 60N via the resistor R3, and the B5 pin is connected to the ground line 60N via a resistor R4.

The A8 pin and the B8 pin of the charging terminal 43 are not connected to the electric circuit of the power supply unit 10. Therefore, the A8 pin and the B8 pin are not used and may also be omitted.

As described above, the IN pin of the protection IC 61 is the power supply pin of the protection IC 61 on the positive electrode side and is connected to the power supply line 60A. The VSS pin of the protection IC 61 is a power supply pin of the protection IC 61 on a negative electrode side and is connected to the ground line 60N. Further, the GND pin of the protection IC 61 is a ground pin of the protection IC 61 and is connected to the ground line 60N. Accordingly, when the plug of the external power supply is inserted into the charging terminal 43, power (for example, USB bus power) is supplied to the protection IC 61 via the power supply line 60A.

The OUT pin of the protection IC 61 is a pin from which a voltage input to the IN pin of the protection IC 61 is output as it is or a voltage (for example, 5.5±0.2 [V]) converted by the protection IC 61 is output, and is connected to the IN pin of the charging IC 55 via the power supply line 60B. The IN pin of the charging IC 55 is a power supply pin of the charging IC 55 on a positive electrode side. Accordingly, an appropriate voltage converted by the protection IC 61 is supplied to the charging IC 55.

The power supply line 60B is connected to the ground line 60N via a capacitor CD2 that functions as a decoupling capacitor. Accordingly, a voltage input to the charging IC 55 via the power supply line 60B can be stabilized.

The VBAT pin of the protection IC 61 is a pin used by the protection IC 61 for detecting presence or absence of connection of the power supply 12, and is connected to a positive electrode side terminal 12a of the power supply 12 via a resistor R5. The resistor R5 is an element that is configured with a resistance element, a transistor, or the like and has a predetermined electric resistance value. The protection IC 61 can detect that the power supply 12 is connected based on a voltage input to the VBAT pin.

The CE pin of the protection IC 61 is a pin for turning on/off an operation (various functions) of the protection IC 61. Specifically, the protection IC 61 operates when a low-level voltage is input to the CE pin, and stops the operation when a high-level voltage is input to the CE pin. In the present embodiment, the CE pin of the protection IC 61 is connected to the ground line 60N so that the low-level voltage is always input. Therefore, the protection IC 61 always operates during a supply of power, and performs conversion to a predetermined voltage, overcurrent detection, overvoltage detection, and the like.

Instead of the protection IC 61 in the present embodiment, a protection IC that operates when a high-level voltage is input to a CE pin and stops the operation when a low-level voltage is input to the CE pin may be used. However, in this case, it should be noted that the CE pin of the protection IC needs to be connected to the power supply line 60B or the power supply line 60A instead of the ground line 60N.

As described above, the IN pin of the charging IC 55 is the power supply pin of the charging IC 55 on the positive electrode side, and is connected to the power supply line 60B. Further, the charging IC 55 is connected to the ground line 60N by, for example, a power supply pin on a negative electrode side (not shown). Accordingly, a voltage output from the protection IC 61 is supplied to the charging IC 55 via the power supply line 60B.

The BAT_1 pin and the BAT_2 pin of the charging IC 55 are pins used to transmit and receive power between the charging IC 55 and the power supply 12, and are connected to the positive electrode side terminal 12a of the power supply 12 via a power supply line 60C. A negative electrode side terminal 12b of the power supply 12 is connected to the ground line 60N.

Specifically, the BAT_1 pin and the BAT_2 pin are connected in parallel, connected to the positive electrode side terminal 12a, and connected to the ground line 60N via a capacitor CD3. When the power supply 12 is discharged, electric charge is accumulated in the capacitor CD3, and a voltage output from the power supply 12 is input to the BAT_1 pin and the BAT_2 pin. Further, when the power supply 12 is charged, a voltage for charging the power supply 12 is output from the BAT_1 pin and the BAT_2 pin, and is applied to the positive electrode side terminal 12a of the power supply 12 via the power supply line 60C.

The power supply line 60C is connected to the ground line 60N via a capacitor CD4 that functions as a decoupling capacitor. Accordingly, a voltage input to the power supply 12 via the power supply line 60C can be stabilized.

The ISET pin of the charging IC 55 is a pin for setting a value of a current output from the charging IC 55 to the power supply 12. In the present embodiment, the ISET pin is connected to the ground line 60N via a resistor R6. Here, the resistor R6 is an element that is configured with a resistance element, a transistor, or the like and has a predetermined electric resistance value.

The charging IC 55 outputs, to the power supply 12, a current having a current value corresponding to an electric resistance value of the resistor R6 connected to the ISET pin.

The TS pin of the charging IC 55 is a pin to which a voltage value applied to a resistor connected to the TS pin is input and that is used to detect an electric resistance value and a temperature of the resistor connected to the TS pin based on the voltage value. In the present embodiment, the TS pin is connected to the ground line 60N via a resistor R7. Here, the resistor R7 is an element that is configured with a resistance element, a transistor, or the like and has a predetermined electric resistance value. Therefore, the charging IC 55 can detect an electric resistance value and a temperature of the resistor R7 based on a voltage value applied to the resistor R7.

The CHG pin of the charging IC 55 is a pin that outputs information on a charging state of the power supply 12 (hereinafter, also referred to as charging state information), such as during charging, during a charging stop, and charging completion, and information on a remaining capacity of the power supply 12 (hereinafter, also referred to as remaining capacity information). The CHG pin of the charging IC 55 is connected to the PB15 pin of the MCU 50. The PB15 pin of the MCU 50 is a pin used to input a signal of the MCU 50. Therefore, the charging IC 55 can notify the MCU 50 of the charging state, the remaining capacity, and the like of the power supply 12 by outputting the charging state information and the remaining capacity information from the CHG pin to the MCU 50.

The OUT_1 pin and the OUT_2 pin of the charging IC 55 are pins from which the standard system voltage is output, and are connected to the IN pin of the LDO regulator 62, the VIN pin of the first DC/DC converter 63, and the VIN pin of the second DC/DC converter 64 via a power supply line 60D. The IN pin of the LDO regulator 62 is a power supply pin of the LDO regulator 62 on a positive electrode side. Further, the VIN pin of the first DC/DC converter 63 is a power supply pin of the first DC/DC converter 63 on a positive electrode side. Then, the VIN pin of the second DC/DC converter 64 is a power supply pin of the second DC/DC converter 64 on a positive electrode side.

Specifically, the OUT_1 pin is connected to the ground line 60N and to the OUT_2 pin via a capacitor CD5 that functions as a decoupling capacitor. Then, the OUT_1 pin and the OUT_2 pin are connected to the ground line 60N via a capacitor CD6 that functions as a decoupling capacitor, and are connected to the IN pin of the LDO regulator 62, the VIN pin of the first DC/DC converter 63, and the VIN pin of the second DC/DC converter 64. Accordingly, the charging IC 55 can supply a stable standard system voltage to the LDO regulator 62, the first DC/DC converter 63, and the second DC/DC converter 64.

In the present embodiment, a capacitor CD7 that functions as a decoupling capacitor is also provided immediately before the first DC/DC converter 63 of the power supply line 60D. Accordingly, a stable standard system voltage can be supplied to the first DC/DC converter 63, and a power supply from the first DC/DC converter 63 to the load 21 can be stabilized.

The ILIM pin of the charging IC 55 is a pin for setting an upper limit of a value of a current output from the charging IC 55 to the LDO regulator 62, the first DC/DC converter 63, and the second DC/DC converter 64. In the present embodiment, the ILIM pin is connected to the ground line 60N via the resistor R7. Here, the resistor R7 is the element that is configured with the resistance element, the transistor, or the like and has a predetermined electric resistance value.

The charging IC 55 outputs, to the LDO regulator 62, the first DC/DC converter 63, and the second DC/DC converter 64, a current whose upper limit is a current value corresponding to the electric resistance value of the resistor R7 connected to the ILIM pin. More specifically, the charging IC 55 outputs the current having the current value corresponding to the electric resistance value of the resistor R6 connected to the ISET pin from the OUT_1 pin and the OUT_2 pin, and stops outputting the current from the OUT_1 pin and the OUT_2 pin when the current value reaches a current value corresponding to the electric resistance value of the resistor R7 connected to the ILIM pin. That is, a manufacturer of the aerosol inhaler 1 can set an upper limit value of the current output from the charging IC 55 to the LDO regulator 62, the first DC/DC converter 63, and the second DC/DC converter 64 by the electric resistance value of the resistor R7 connected to the ILIM pin.

An LED circuit C1 is provided by branching from the power supply line 60D. The LED circuit C1 is configured by connecting a resistor R8, an LED 70, and a switch SW1 in series. Here, the resistor R8 is an element that is configured with a resistance element, a transistor, or the like and has a predetermined electric resistance value. The resistor R8 is mainly used to limit a voltage applied to the LED 70 and/or a current supplied to the LED 70. The LED 70 is a light-emitting portion provided at a position corresponding to the remaining amount check window 11w inside the power supply unit 10, and configured to illuminate an outside of the power supply unit 10 from an inside of the power supply unit 10 via the remaining amount check window 11w. When the LED 70 emits light, visibility of a remaining amount of the first cartridge 20 (specifically, a remaining amount of the aerosol source 22 stored in the first cartridge 20) via the remaining amount check window 11w is improved. The switch SW1 is, for example, a switch configured with a MOSFET or the like.

One end of the LED circuit C1 on a resistor R8 side, that is, one end of the resistor R8 is connected to a node N21 provided in the power supply line 60D. The other end of the resistor R8 constitutes a connector 70a and is connected to a terminal of the LED 70 on an anode side. One end of the switch SW1 constitutes a connector 70b and is connected to a terminal of the LED 70 on a cathode side. The other end of the LED circuit C1 on a switch SW1 side, that is, the other end of the switch SW1 is connected to the ground line 60N.

The switch SW1 is also connected to the MCU 50 as will be described later, is turned on in response to an on command of the MCU 50, and is turned off in response to an off command of the MCU 50. The LED circuit C1 is in a conductive state when the switch SW1 is turned on. Then, the LED 70 emits light when the LED circuit C1 is in the conductive state.

As described above, the IN pin of the LDO regulator 62 is the power supply pin of the LDO regulator 62 on the positive electrode side, and is connected to the power supply line 60D. The GND pin of the LDO regulator 62 is a ground pin of the LDO regulator 62 and is connected to the ground line 60N. Accordingly, the standard system voltage output from the charging IC 55 is supplied to the LDO regulator 62 via the power supply line 60D.

The OUT pin of the LDO regulator 62 is a pin that outputs a low-voltage system voltage generated by the LDO regulator 62, and is connected to the VDD pin and the VDD_USB pin of the MCU 50, the VCC pin of the intake sensor 15, the VDD pin and the IXS pin of the display driver

65, and the positive electrode side terminal 47a connected to the vibrator 47 via the power supply line 60E. The VDD pin and the VDD_USB pin of the MCU 50 are power supply pins of the MCU 50 on a positive electrode side. Further, the VCC pin of the intake sensor 15 is a power supply pin of the intake sensor 15 on a positive electrode side. Then, the VDD pin of the display driver 65 is a power supply pin of the display driver 65 on a positive electrode side. Accordingly, the LDO regulator 62 can supply the low-voltage system voltage to the MCU 50, the intake sensor 15, the display driver 65, and the vibrator 47.

The EN pin of the LDO regulator 62 is a pin for turning on/off an operation (a function) of the LDO regulator 62. Specifically, the LDO regulator 62 operates when a high-level voltage is input to the EN pin, and stops the operation when the high-level voltage is not input to the EN pin.

In the present embodiment, the EN pin of the LDO regulator 62 is connected to the power supply line 60D and also connected to the ground line 60N via a capacitor CD8. Therefore, when the standard system voltage is output from the charging IC 55, electric charge is accumulated in the capacitor CD8, the high-level voltage is input to the EN pin of the LDO regulator 62, the LDO regulator 62 operates, and the low-voltage system voltage is output from the LDO regulator 62.

That is, in the power supply unit 10, the capacitor CD8 connected to the EN pin of the LDO regulator 62 can be charged by power from the charging IC 55, and a high-level signal can be input to the EN pin of the LDO regulator 62. Accordingly, even when the LDO regulator 62 and the MCU 50 are in a stopped state due to power shortage of the power supply 12, the LDO regulator 62 can be reactivated by power from the external power supply, and the MCU 50 can also be reactivated by power from the LDO regulator 62.

As described above, the VDD pin and the VDD_USB pin of the MCU 50 are power supply pins of the MCU 50 on the positive electrode side, and are connected to the power supply line 60E. The VSS pin of the MCU 50 is a power supply pin of the MCU 50 on a negative electrode side and is connected to the ground line 60N. Accordingly, a low-voltage system voltage output from the LDO regulator 62 is supplied to the MCU 50 via the power supply line 60E. The VDD pin and the VDD_USB pin may be combined as one pin.

A thermistor circuit C2 is provided by branching from the power supply line 60E. The thermistor circuit C2 is configured by connecting a switch SW2, a resistor R9, and a thermistor TH in series. One end of the thermistor circuit C2 on a switch SW2 side is connected to a node N31 provided in the power supply line 60E. Further, the other end of the thermistor circuit C2 on a thermistor TH side is connected to the ground line 60N.

Here, the switch SW2 is a switch configured with, for example, a MOSFET or the like. The switch SW2 is connected to the MCU 50 as will be described later, is turned on in response to the on command of the MCU 50, and is turned off in response to the off command of the MCU 50. The thermistor circuit C2 is in a conductive state when the switch SW2 is turned on.

The resistor R9 is an element that is configured with a resistance element, a transistor, or the like and has a predetermined electric resistance value. The thermistor TH includes an element having negative temperature coefficient (NTC) characteristics or positive temperature coefficient (PTC) characteristics, that is, an element having a correlation between an electric resistance value and a temperature, and the like. The thermistor TH is disposed in the vicinity of the power supply 12 in a state where a temperature of the power supply 12 can be detected.

The PC1 pin of the MCU 50 is connected to a node N32 provided between the resistor R9 and the thermistor TH in the thermistor circuit C2. When the thermistor circuit C2 is in the conductive state (that is, when the switch SW2 is turned on), a voltage divided by the resistor R9 and the thermistor TH is input to the PC1 pin. The MCU 50 can detect a temperature of the thermistor TH, that is, the temperature of the power supply 12, based on a voltage value input to the PC1 pin.

The PA8 pin of the MCU 50 is a pin that is connected to the switch SW2 and outputs an on command to turn on the switch SW2 and an off command to turn off the switch SW2. The MCU 50 can turn on the switch SW2 to put the thermistor circuit C2 in the conductive state by outputting the on command from the PA8 pin. Further, the MCU 50 can turn off the switch SW2 to put the thermistor circuit C2 in a non-conductive state by outputting the off command from the PA8 pin. As a specific example, when the switch SW2 is a switch configured with a MOSFET, the PA8 pin of the MCU 50 is connected to a gate terminal of the MOSFET. Then, the MCU 50 can control on/off of the switch SW2 by controlling a gate voltage (that is, an output from the PA8 pin) applied to the gate terminal.

In the power supply line 60E, the switch SW3 is provided in front of the positive electrode side terminal 47a. Here, the switch SW3 is a switch configured with, for example, a MOSFET or the like. The switch SW3 is connected to the MCU 50, is turned on in response to the on command of the MCU 50, and is turned off in response to the off command of the MCU 50.

Specifically, the PC6 pin of the MCU 50 is a pin that is connected to the switch SW3 and outputs an on command to turn on the switch SW3 and an off command to turn off the switch SW3. When the on command is output from the PC6 pin, the MCU 50 can turn on the switch SW3, supply power to the vibrator 47 by the power supply line 60E, and vibrate the vibrator 47. Further, when the off command is output from the PC6 pin, the MCU 50 can turn off the switch SW3, and stop the supply of power to the vibrator 47 by the power supply line 60E (that is, the vibration of the vibrator 47). As a specific example, when the switch SW3 is a switch configured with a MOSFET, the PC6 pin of the MCU 50 is connected to a gate terminal of the MOSFET. Then, the MCU 50 can control on/off of the switch SW3 by controlling a gate voltage (that is, an output from the PC6 pin) applied to the gate terminal.

A Zener diode D is connected to the power supply line 60E. Here, the Zener diode is a diode that includes two terminals (electrodes) on an anode side and a cathode side, and in which a current rapidly flows from the cathode side to the anode side when a voltage of a terminal on the anode side exceeds a predetermined Zener voltage (also referred to as a breakdown voltage, for example, in a case of the present embodiment, a voltage lower than the variable resistor voltage described above).

Specifically, one end of the Zener diode D on the anode side is connected to the ground line 60N, and the other end of the Zener diode D on the cathode side is connected to a node N41 provided in the power supply line 60E. Here, the node N41 is provided between the switch SW3 and the positive electrode side terminal 47a in the power supply line 60E. Accordingly, even when a counter-electromotive force having a voltage higher than the Zener voltage of the Zener diode D is generated from the vibrator 47 when the vibrator 47 is turned on/off, as indicated by an arrow of a reference numeral C3 in FIG. 4, a current due to the counter-electromotive force can flow through a closed circuit formed by the vibrator 47 and the Zener diode D. Therefore, it is possible to prevent the current due to the counter-electromotive force from flowing to an outside of the closed circuit formed by the vibrator 47 and the Zener diode D, and to protect the electronic components of the power supply unit 10 such as the power supply 12 and the LDO regulator 62 provided outside the closed circuit.

A capacitor CD9 may be connected to the power supply line 60E. Specifically, in this case, one end of the capacitor CD9 is connected to a node N42 provided in the power supply line 60E, and the other end of the capacitor CD9 is connected to the ground line 60N. Here, the node N42 is provided on a positive electrode side terminal 47a side with respect to the node N41 in the power supply line 60E. In this way, the capacitor CD9 can be disposed in the closed circuit formed by the vibrator 47 and the Zener diode D described above, and the capacitor CD9 can also protect the electronic components of the power supply unit 10 such as the power supply 12 and the LDO regulator 62 provided outside the closed circuit formed by the vibrator 47 and the Zener diode D. The capacitor CD9 may not be provided in the closed circuit described above, but may be provided in the vicinity of the closed circuit. As a specific example, the capacitor CD9 may be provided between the switch SW3 and the Zener diode D. Even in this way, the capacitor CD9 and the Zener diode D can protect the electronic components of the power supply unit 10 such as the power supply 12 and the LDO regulator 62.

The PB3 pin of the MCU 50 is a pin that is connected to the EN pin of the first DC/DC converter 63 and outputs a predetermined voltage signal. The MCU 50 can turn on/off the operation of the first DC/DC converter 63 by the voltage signal output from the PB3 pin. Specifically, the MCU 50 can cause the first DC/DC converter 63 to operate (that is, enable the first DC/DC converter 63) by outputting a high-level voltage signal from the PB3 pin. Further, the MCU 50 can stop the operation of the first DC/DC converter 63 (that is, disable the first DC/DC converter 63) by outputting a low-level voltage signal from the PB3 pin.

The PB4 pin of the MCU 50 is a pin that is connected to the switch SW4 described later and provided between the first DC/DC converter 63 and the discharging terminal 41, and that outputs an on command to turn on the switch SW4 and an off command to turn off the switch SW4. The MCU 50 can supply power to the load 21 as will be described later by outputting the on command from the PB4 pin to turn on the switch SW4. Further, the MCU 50 can stop the supply of power to the load 21 by outputting the off command from the PB4 pin to turn off the switch SW4. As a specific example, when the switch SW4 is a switch configured with a MOSFET, the PB4 pin of the MCU 50 is connected to a gate terminal of the MOSFET. Then, the MCU 50 can control on/off of the switch SW4 by controlling a gate voltage (that is, an output from the PB4 pin) applied to the gate terminal.

As described above, the PB15 pin of the MCU 50 is a pin that is connected to the CHG pin of the charging IC 55 and receives input of the charging state information and the remaining capacity information output by the charging IC 55.

The PA0 pin of the MCU 50 is a pin that is connected to the switch SW1 of the LED circuit C1 and outputs an on command to turn on the switch SW1 and an off command to turn off the switch SW1. The MCU 50 can put the LED circuit C1 in a conductive state to cause the LED 70 to emit light (be turned on) by outputting the on command from the PA0 pin to turn on the switch SW1. Further, the MCU 50 can put the LED circuit C1 in a non-conductive state to turn off the LED 70 by outputting the off command from the PA0 pin to turn off the switch SW1. As a specific example, when the switch SW1 is a switch configured with a MOSFET, the PA0 pin of the MCU 50 is connected to a gate terminal of the MOSFET. Then, the MCU 50 can control on/off of the switch SW1 by controlling a gate voltage (that is, an output from the PA0 pin) applied to the gate terminal. Further, the MCU 50 can switch between the conductive state and the non-conductive state of the LED circuit C1 at a high speed to cause the LED 70 to blink by outputting while switching the on command and the off command from the PA0 pin at a high speed.

The PC5 pin of the MCU 50 is a pin that is connected to the OUT pin of the intake sensor 15 and receives an output of the intake sensor 15 (that is, a signal indicating a detection result of the intake sensor 15).

The PA11 pin and the PA12 pin of the MCU 50 are pins used for input and output of a signal for communication between the power supply unit 10 and the external apparatus. Specifically, as described above, the PA11 pin is connected to the A7 pin and the B7 pin of the charging terminal 43 via the resistor R2, and is used for input and output of a signal on the Dn side. Further, as described above, the PA12 pin is connected to the A6 pin and the B6 pin of the charging terminal 43 via the resistor R1, and is used for input and output of a signal on the Dp side.

The PC12 pin of the MCU 50 is a pin that is connected to the EN pin of the second DC/DC converter 64 and outputs a predetermined voltage signal. The MCU 50 can turn on/off an operation of the second DC/DC converter 64 by the voltage signal output from the PC12 pin. Specifically, the MCU 50 can cause the second DC/DC converter 64 to operate (that is, enable the second DC/DC converter 64) by outputting a high-level voltage signal from the PC12 pin. Further, the MCU 50 can stop the operation of the second DC/DC converter 64 (that is, disable the second DC/DC converter 64) by outputting a low-level voltage signal from the PC12 pin.

The PB8 pin and the PB9 pin of the MCU 50 are pins used to output a signal for communication between the MCU 50 and another IC, and are used for communication between the MCU 50 and the display driver 65 in the present embodiment. Specifically, in the present embodiment, the MCU 50 and the display driver 65 perform inter-integrated circuit (I2C) communication. The PB8 pin is used to output a signal of the I2C communication on an SCL side, and the PB9 pin is used to output a signal of the I2C communication on an SDA side. The MCU 50 can control the display driver 65 by the signals output from the PB8 pin and the PB9 pin to control a display content of the display 16 (the OLED panel 46).

As described above, the VCC pin of the intake sensor 15 is the power supply pin of the intake sensor 15 on the positive electrode side, and is connected to the power supply line 60E. The GND pin of the intake sensor 15 is a ground pin of the intake sensor 15 and is connected to the ground line 60N. Accordingly, the low-voltage system voltage output from the LDO regulator 62 is supplied to the intake sensor 15 via the power supply line 60E.

As described above, the OUT pin of the intake sensor 15 is a pin that outputs the signal indicating the detection result of the intake sensor 15, and is connected to the PC5 pin of the MCU 50. Accordingly, the intake sensor 15 can notify the MCU 50 of the detection result.

As described above, the VIN pin of the first DC/DC converter 63 is the power supply pin of the first DC/DC converter 63 on the positive electrode side, and is connected to the power supply line 60D. Further, the VIN pin of the first DC/DC converter 63 is also connected to the SW pin (the switch pin) of the first DC/DC converter 63 via a coil CL1. The GND pin of the first DC/DC converter 63 is a ground pin of the first DC/DC converter 63, and is connected to the ground line 60N.

The VOUT pin of the first DC/DC converter 63 is a pin that outputs the first high-voltage system voltage generated by the first DC/DC converter 63, and is connected to the positive electrode side discharging terminal 41a of the discharging terminal 41 via a power supply line 60F. The negative electrode side discharging terminal 41b of the discharging terminal 41 is connected to the ground line 60N.

The switch SW4 is provided in the power supply line 60F. The switch SW4 is, for example, a switch configured with a MOSFET or the like, and more specifically, is a power MOSFET having a high switching speed. The switch SW4 is connected to the MCU 50 as described above, is turned on in response to the on command of the MCU 50, and is turned off in response to the off command of the MCU 50. When the switch SW4 is turned on, the power supply line 60F is in a conductive state, and the first high-voltage system voltage is supplied to the load 21 via the power supply line 60F.

A variable resistor VR4 is connected to the power supply line 60F. Specifically, one end of the variable resistor VR4 is connected to a node N51 provided in the power supply line 60F, and the other end of the variable resistor VR4 is connected to the ground line 60N. Here, the node N51 is provided on a positive electrode side discharging terminal 41a side with respect to the switch SW4, that is, on an output side of the switch SW4 in the power supply line 60F. In other words, the variable resistor VR4 is connected between the discharging terminal 41 and the power supply 12, more specifically, between the discharging terminal 41 and the first DC/DC converter 63 (more specifically, the switch SW4).

Therefore, for example, even when static electricity is generated in the discharging terminal 41 due to friction between the discharging terminal 41 and the load 21 when the first cartridge 20 is replaced, the static electricity can be released to the ground line 60N via the variable resistor VR4 to protect the switch SW4, the first DC/DC converter 63, the power supply 12, and the like. Further, even when the variable resistor VR4 fails, the switch SW4 and the first DC/DC converter 63 can serve as a barrier against noise (in this case, the static electricity generated in the discharging terminal 41) for another element (for example, the charging IC 55) on a power supply 12 side with respect to the switch SW4 and the first DC/DC converter 63, and can protect another element.

A capacitor CD10 that functions as a decoupling capacitor is connected to the power supply line 60F. Specifically, one end of the capacitor CD10 is connected to a node N52 provided in the power supply line 60F, and the other end of the capacitor CD10 is connected to the ground line 60N. Here, the node N52 is provided between the node N51 and the switch SW4 in the power supply line 60F. In other words, the capacitor CD10 is connected to the output side of the switch SW4. Accordingly, power supply from the switch SW4 to the load 21 can be stabilized, and even when static electricity is generated in the discharging terminal 41, the variable resistor VR4 can protect the capacitor CD10 from the static electricity.

A capacitor CD11 that functions as a decoupling capacitor may be connected to the power supply line 60F. Specifically, in this case, one end of the capacitor CD11 is connected to a node N53 provided in the power supply line 60F, and the other end of the capacitor CD11 is connected to the ground line 60N. Here, the node N53 is provided between the switch SW4 and the first DC/DC converter 63 in the power supply line 60F. In other words, the capacitor CD11 is connected to an output side of the first DC/DC converter 63. Accordingly, power supply from the first DC/DC converter 63 to the switch SW4 (for example, the power MOSFET) can be stabilized. As a result, power supply to the load 21 can be stabilized.

As described above, the EN pin of the first DC/DC converter 63 is a pin for setting the operation of the first DC/DC converter 63 on/off and is connected to the PB3 pin of the MCU 50.

The MODE pin of the first DC/DC converter 63 is a pin for setting an operation mode of the first DC/DC converter 63. The first DC/DC converter 63 is, for example, a switching regulator, and can have a pulse width modulation mode (hereinafter, also referred to as a PWM mode) and a pulse frequency modulation mode (hereinafter, also referred to as a PFM mode) as operation modes. In the present embodiment, by connecting the MODE pin to the power supply line 60D, a high-level voltage is input to the MODE pin when the first DC/DC converter 63 can operate, and the first DC/DC converter 63 is set to operate in the PWM mode.

As described above, the VIN pin of the second DC/DC converter 64 is the power supply pin of the second DC/DC converter 64 on the positive electrode side, and is connected to the power supply line 60D. Further, the VIN pin of the second DC/DC converter 64 is also connected to the SW pin (the switch pin) of the second DC/DC converter 64 via a coil CL2. The GND pin of the second DC/DC converter 64 is a ground pin of the second DC/DC converter 64 and is connected to the ground line 60N.

The VOUT pin of the second DC/DC converter 64 is a pin that outputs the second high-voltage system voltage generated by the second DC/DC converter 64, and is connected to the VCC_C pin of the display driver 65 via a power supply line 60G. Accordingly, the second DC/DC converter 64 can supply the second high-voltage system voltage to the display driver 65.

A variable resistor VR5 is connected to the power supply line 60G. Specifically, one end of the variable resistor VR5 is connected to a node N61 provided in the power supply line 60G, and the other end of the variable resistor VR5 is connected to the ground line 60N. In other words, the variable resistor VR5 is connected between a connector portion connected to the VCC_C pin of the display driver 65 and the second DC/DC converter 64 in the power supply line 60G.

Therefore, even when static electricity is generated in the display 16 by contact of the display 16 exposed to an outside of the aerosol inhaler 1 with any object (for example, a hand of the user) and the static electricity flows back to a second DC/DC converter 64 side via the OLED panel 46 and the display driver 65, the static electricity can be released to the ground line 60N via the variable resistor VR5, and the second DC/DC converter 64 and the like can be protected from the static electricity. Further, even when the variable resistor VR5 fails, the second DC/DC converter 64 can serve as a barrier against noise (in this case, the static electricity generated in the display 16) for another element (for example, the LDO regulator 62) on the power supply 12 side with respect to the variable resistor VR5, and can protect another element. That is, in the power supply line 60G, by providing the node N62 on a second DC/DC converter side with respect to the node N61, it is possible to achieve both protection of the display driver 65 from overvoltage and a stable operation of the display driver 65.

From the same viewpoint, a variable resistor VR6 is also connected to the power supply line 60E. Specifically, one end of the variable resistor VR6 is connected to a node N43 provided in the power supply line 60E, and the other end of the variable resistor VR6 is connected to the ground line 60N. Here, the node N43 is provided between the LDO regulator 62 and the switch SW3 in the power supply line 60E. Therefore, even when static electricity is generated in the display 16 by contact of the display 16 exposed to the outside of the aerosol inhaler 1 with any object and the static electricity flows back to an LDO regulator 62 side via the OLED panel 46 and the display driver 65, the static electricity can be released to the ground line 60N via the variable resistor VR6, and the LDO regulator 62 can be protected from the static electricity.

A capacitor CD12 that functions as a decoupling capacitor is connected to the power supply line 60G. Specifically, one end of the capacitor CD12 is connected to a node N62 provided in the power supply line 60G, and the other end of the capacitor CD12 is connected to the ground line 60N. Here, the node N62 is provided on the second DC/DC converter 64 side with respect to the node N61 in the power supply line 60G. Accordingly, a stable second high-voltage system voltage can be supplied to the display driver 65, and even when static electricity is generated in the display 16, the variable resistor VR5 can protect the capacitor CD12 from the static electricity.

The EN pin of the second DC/DC converter 64 is a pin for setting the operation of the second DC/DC converter 64 on/off and is connected to the PC12 pin of the MCU 50 as described above.

As described above, the VDD pin of the display driver 65 is the power supply pin of the display driver 65 on the positive electrode side and is connected to the power supply line 60E. Further, the VSS pin of the display driver 65 is a power supply pin of the display driver 65 on a negative electrode side and is connected to the ground line 60N. Accordingly, the low-voltage system voltage output from the LDO regulator 62 is supplied to the display driver 65 via the power supply line 60E. The low-voltage system voltage supplied to the display driver 65 is used as a power supply for operating the display driver 65.

The VCC_C pin of the display driver 65 is a pin that receives the second high-voltage system voltage, and is connected to the VOUT pin of the second DC/DC converter 64 via the power supply line 60G as described above. When receiving the second high-voltage system voltage by the VCC_C pin, the display driver 65 supplies the received second high-voltage system voltage to the OLED panel 46 via a power supply line 60H. Accordingly, the display driver 65 can cause the OLED panel 46 to operate. The display driver 65 and the OLED panel 46 may also be connected by another line (not shown).

The SCL pin of the display driver 65 is a pin that receives a signal on an SCL side in I2C communication between the MCU 50 and the display driver 65, and is connected to the PB8 pin of the MCU 50 as described above. Further, the SDA pin of the display driver 65 is a pin that receives a signal on an SDA side in the I2C communication between the MCU 50 and the display driver 65, and is connected to the PB9 pin of the MCU 50 as described above.

The IXS pin of the display driver 65 is a pin for setting which of the I2C communication and serial peripheral interface (SPI) communication is used to perform communication between the display driver 65 and another IC (the MCU 50 in the present embodiment). In the present embodiment, by connecting the IXS pin to the power supply line 60E, a high-level voltage is input to the IXS pin, and the communication between the display driver 65 and the MCU 50 is set to be performed by the I2C communication. The communication between the display driver 65 and the MCU 50 may be set to be performed by the SPI communication by inputting a low-level voltage to the IXS pin.

(MCU)

Next, a configuration of the MCU 50 will be described with reference to FIG. 5.

As shown in FIG. 5, the MCU 50 includes an aerosol generation request detection unit 51, a temperature detection unit 52, a power control unit 53, and a notification control unit 54 as functional blocks implemented by the processor executing a program stored in a ROM (not shown).

The aerosol generation request detection unit 51 detects an aerosol generation request based on an output result of the intake sensor 15. The intake sensor 15 is configured to output a value of a change in a pressure (an internal pressure) in the power supply unit 10 caused by suction of the user through the suction port 32. The intake sensor 15 is, for example, a pressure sensor that outputs an output value (for example, a voltage value or a current value) corresponding to an internal pressure that changes according to a flow rate of air sucked from an intake port (not shown) toward the suction port 32 (that is, a puff operation of the user). The intake sensor 15 may be configured with a condenser microphone or the like. The intake sensor 15 may output an analog value or may output a digital value converted from the analog value. Further, the intake sensor 15 may transmit an output to the aerosol generation request detection unit 51 by using the I2C communication, the SPI communication, or the like described above.

The temperature detection unit 52 detects a temperature of the power supply 12 based on an input from the thermistor circuit C2. Specifically, the temperature detection unit 52 applies a voltage to the thermistor circuit C2 by turning on the switch SW2, and detects a temperature of the thermistor TH, that is, the temperature of the power supply 12 based on a voltage value input from the thermistor circuit C2 to the MCU 50 (for example, the PC1 pin) at that time. Further, for example, an electric resistance value of the load 21 may be configured to be detectable, and the temperature detection unit 52 may detect a temperature of the load 21.

The power control unit 53 controls a supply of power to the electronic components of the aerosol inhaler 1. For example, when the aerosol generation request detection unit 51 detects the aerosol generation request, the power control unit 53 causes the first DC/DC converter 63 to operate and controls switching of the switch SW4 to supply the first high-voltage system voltage to the load 21 via the positive electrode side discharging terminal 41a. Accordingly, the MCU 50 can supply power of the first high-voltage system voltage to the load 21, cause the load 21 to be heated (to function), and cause an aerosol to be generated. Then, in this way, power from the charging IC 55 (that is, power of the standard system voltage) is boosted to the first high-voltage system voltage by the first DC/DC converter 63 and supplied to the load 21, so that an amount of an aerosol generated by the load 21 and a flavor can be improved as compared with a case where the power from the charging IC 55 is supplied to the load 21 without being boosted.

The power control unit 53 supplies the standard system voltage to the vibrator 47 via the positive electrode side terminal 47a by turning on the switch SW3 at a predetermined timing. Accordingly, the MCU 50 can supply the power of the standard system voltage to the vibrator 47 to cause the vibrator 47 to vibrate (function).

The power control unit 53 supplies the second high-voltage system voltage to the OLED panel 46 via the display driver 65 by causing the second DC/DC converter 64 to operate at a predetermined timing. Accordingly, the MCU 50 can supply power of the second high-voltage system voltage to the OLED panel 46 to cause the OLED panel 46 to operate (function).

When the aerosol generation request detection unit 51 detects the aerosol generation request, the power control unit 53 further turns on the switch SW1 to put the LED circuit C1 in a conductive state, and causes the LED 70 to emit light (function). In this case, a voltage obtained by lowering the standard system voltage from the charging IC 55 by the resistor R8 is supplied to the connector 70a. That is, by turning on the switch SW1, the power control unit 53 can supply power of the voltage obtained by lowering the standard system voltage by the resistor R8 to the LED 70 via the connector 70a.

For example, the power control unit 53 performs control such that the power supplied to the LED 70 is smaller than power supplied to other electronic components such as the load 21, the OLED panel 46, and the vibrator 47. That is, the power control unit 53 performs control such that the power supplied to the connector 70a is smaller than the power supplied to the positive electrode side discharging terminal 41a, the positive electrode side terminal 47a, and the like. Accordingly, it is possible to supply appropriate power to the LED 70 with a simple configuration, and to implement high functionality of the aerosol inhaler 1 while preventing an increase in a manufacturing cost of the aerosol inhaler 1 (for example, the power supply unit 10).

The notification control unit 54 controls the notification unit 45 to notify various pieces of information. For example, the notification control unit 54 controls the notification unit 45 to notify a replacement timing of the second cartridge 30 in response to detection of the replacement timing of the second cartridge 30. The notification control unit 54 detects and notifies the replacement timing of the second cartridge 30 based on a cumulative number of times of the puff operation or a cumulative energization time to the load 21 stored in the memory 19. The notification control unit 54 may notify not only the replacement timing of the second cartridge 30, but also a replacement timing of the first cartridge 20, a replacement timing of the power supply 12, a charging timing of the power supply 12, and the like.

In a state where one unused second cartridge 30 is set, when the puff operation is performed a predetermined number of times, or when the cumulative energization time to the load 21 by the puff operation reaches a predetermined value (for example, 120 seconds), the notification control unit 54 may determine that the second cartridge 30 has been used (that is, the remaining amount is zero or empty), and may notify the replacement timing of the second cartridge 30.

When it is determined that all of the second cartridges 30 included in the one set have been used, the notification control unit 54 may determine that one first cartridge 20 included in the one set has been used (that is, the remaining amount is zero or empty), and may notify the replacement timing of the first cartridge 20. In addition to or instead of these, the notification control unit 54 may also notify a remaining amount of the first cartridge 20, a remaining amount of the second cartridge 30, a remaining capacity of the power supply 12, and the like.

(Plug Inserted into Charging Terminal)

Figure 6:
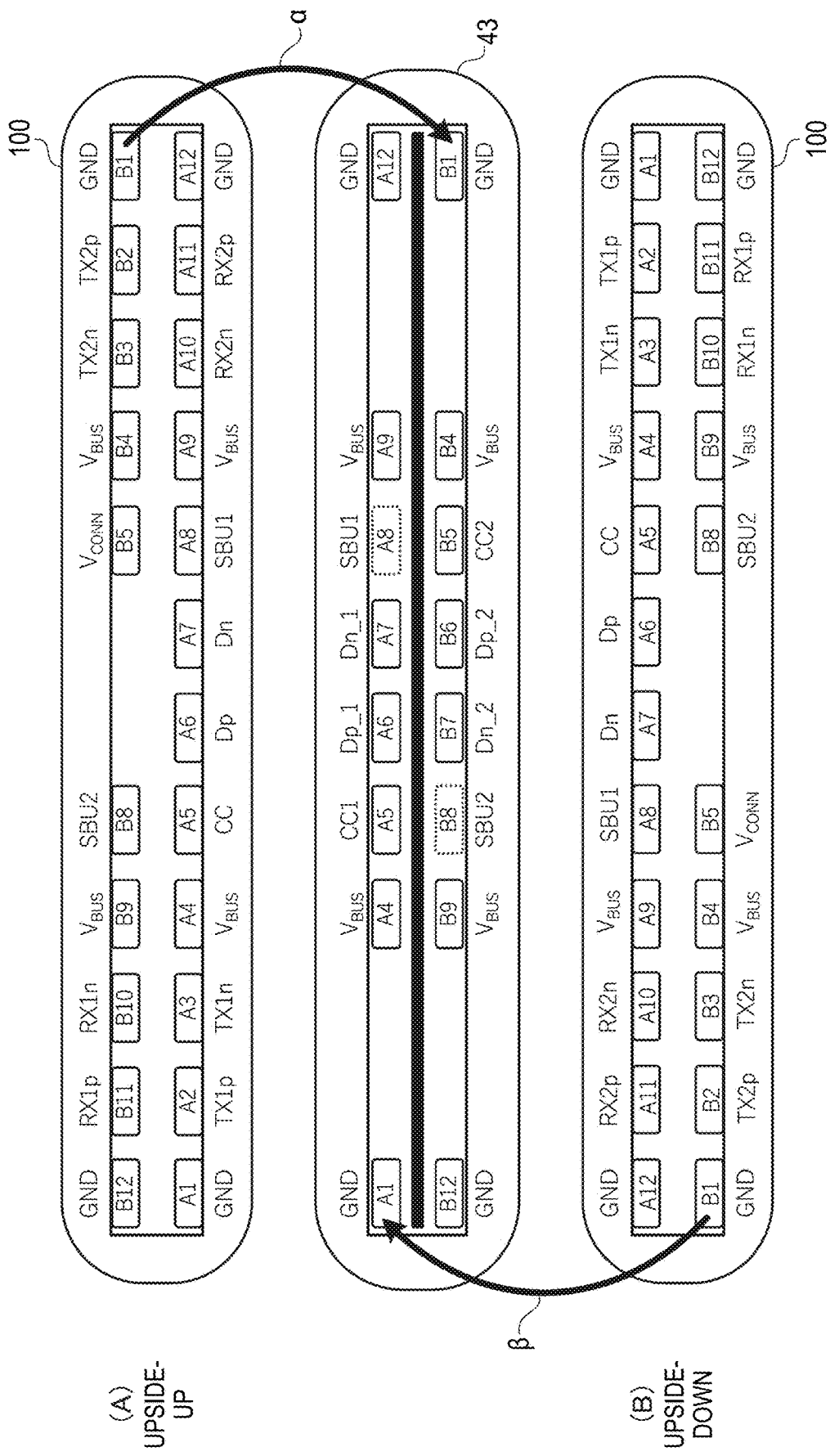
FIG. 6 is a diagram showing an example of a charging terminal provided in the aerosol inhaler of FIG. 1 and a plug inserted into the charging terminal.

Next, a plug inserted into the charging terminal 43 will be described with reference to FIG. 6. FIG. 6 shows an example of a fitting surface of the charging terminal 43 with the plug and an example of a fitting surface of the plug with the charging terminal 43.

A plug 100 shown in FIG. 6 is an example of a plug inserted into the charging terminal 43, and is provided at an end portion of a cable (not shown) connected to an electronic apparatus (not shown, hereinafter, also simply referred to as electronic apparatus) that can function as an external power supply that supplies power to the external apparatus such as the power supply unit 10. An example of the electronic apparatus is a personal computer (PC), but the electronic apparatus is not limited to the PC, and may be any apparatus including a terminal (for example, a USB port) that can output power to an outside. Further, the cable including the plug 100 is, for example, an E-Marked cable including an IC referred to as "eMarker".

The plug 100 has a shape that fits with the charging terminal 43 when the plug 100 is inserted into the charging terminal 43. Then, the plug 100 is inserted into the charging terminal 43 to supply power from the electronic apparatus (for example, power for charging the power supply 12) to the power supply unit 10. As the plug 100, various USB terminals (plugs) or the like can be used. As an example, in the present embodiment, the plug 100 is a USB Type-C plug.

The plug 100 includes a plurality of pins (terminals) including pins electrically connected to the pins of the charging terminal 43 when the plug 100 is inserted into the charging terminal 43. Specifically, the plug 100 includes an A1 pin (indicated by "A1" in the plug 100 in FIG. 6), an A2 pin (indicated by "A2" in the plug 100 in FIG. 6), an A3 pin (indicated by "A3" in the plug 100 in FIG. 6), an A4 pin (indicated by "A4" in the plug 100 in FIG. 6), an A5 pin (indicated by "A5" in the plug 100 in FIG. 6), an A6 pin (indicated by "A6" in the plug 100 in FIG. 6), an A7 pin (indicated by "A7" in the plug 100 in FIG. 6), an A8 pin (indicated by "A8" in the plug 100 in FIG. 6), an A9 pin (indicated by "A9" in the plug 100 in FIG. 6), an A10 pin (indicated by "A10" in the plug 100 in FIG. 6), an A11 pin (indicated by "A11" in the plug 100 in FIG. 6), and an A12 pin (indicated by "A12" in the plug 100 in FIG. 6).

The plug 100 further includes a B1 pin (indicated by "B1" in the plug 100 in FIG. 6), a B2 pin (indicated by "B2" in the plug 100 in FIG. 6), a B3 pin (indicated by "B3" in the plug 100 in FIG. 6), a B4 pin (indicated by "B4" in the plug 100 in FIG. 6), a B5 pin (indicated by "B5" in the plug 100 in FIG. 6), a B8 pin (indicated by "B8" in the plug 100 in FIG. 6), a B9 pin (indicated by "B9" in the plug 100 in FIG. 6), a B10 pin (indicated by "B10" in the plug 100 in FIG. 6), a B11 pin (indicated by "B11" in the plug 100 in FIG. 6), and a B12 pin (indicated by "B12" in the plug 100 in FIG. 6).

In the plug 100, the A1 pin, the A2 pin, the A3 pin, the A4 pin, the A5 pin, the A8 pin, the A9 pin, the A10 pin, the A11 pin, and the A12 pin, and the B1 pin, the B2 pin, the B3 pin, the B4 pin, the B5 pin, the B8 pin, the B9 pin, the B10 pin, the B11 pin, and the B12 pin are arranged so as to be point-symmetrical with respect to a center of the fitting surface with the charging terminal 43 as a point of symmetry. Accordingly, the plug 100 can be inserted into the charging terminal 43 that is in a direction shown in FIG. 6 in either an upside-up direction shown in (A) in FIG. 6 or an upside-down direction shown in (B) in FIG. 6.

Here, the upside-up direction is a direction in which the B1 pin of the plug 100 faces the B1 pin of the charging terminal 43, the B12 pin of the plug 100 faces the B12 pin of the charging terminal 43, the A1 pin of the plug 100 faces the A1 pin of the charging terminal 43, and the A12 pin of the plug 100 faces the A12 pin of the charging terminal 43 when viewed from an insertion direction (for example, the upper-lower direction).

The upside-down direction is a direction in which the B1 pin of the plug 100 faces the A1 pin of the charging terminal 43, the B12 pin of the plug 100 faces the A12 pin of the charging terminal 43, the A1 pin of the plug 100 faces the B1 pin of the charging terminal 43, and the A12 pin of the plug 100 faces the B12 pin of the charging terminal 43 when viewed from the insertion direction (for example, the upper-lower direction). That is, the upside-down direction is a direction in which the plug 100 is rotated 180 degrees in a rolling direction from the upside-up direction.

The A1 pin, the A12 pin, the B1 pin, and the B12 pin of the plug 100 are ground pins. The A4 pin, the A9 pin, the B4 pin, and the B9 pin of the plug 100 are pins corresponding to a power line that supplies power from the electronic apparatus to the external apparatus (for example, the power supply unit 10).

The A2 pin, the A3 pin, the A6 pin, the A7 pin, the A10 pin, the A11 pin, the B2 pin, the B3 pin, the B10 pin, and the B11 pin of the plug 100 are pins used to input and output a signal for communication between the electronic apparatus and the external apparatus.

Specifically, the A2 pin, the A3 pin, the A10 pin, the A11 pin, the B2 pin, the B3 pin, the B10 pin, and the B11 pin of the plug 100 are pins corresponding to a high-speed signal line used for high-speed communication. More specifically, in the present embodiment, the A2 pin, the A3 pin, the A10 pin, the A11 pin, the B2 pin, the B3 pin, the B10 pin, and the B11 pin of the plug 100 are pins corresponding to Super-Speed signal lines of a SuperSpeed USB.

Then, the A2 pin of the plug 100 is a pin corresponding to a signal line TX1$p$ (also referred to as TX1+) among the SuperSpeed signal lines. The A3 pin of the plug 100 is a pin corresponding to a signal line TX1$n$ (also referred to as TX1−) among the SuperSpeed signal lines. The A10 pin of the plug 100 is a pin corresponding to a signal line RX2$n$ (also referred to as "RX2−") among the SuperSpeed signal lines. The A11 pin of the plug 100 is a pin corresponding to a signal line RX2$p$ (also referred to as RX2+) among the SuperSpeed signal lines.

The B2 pin of the plug 100 is a pin corresponding to a signal line TX2$p$ (also referred to as TX2+) among the SuperSpeed signal lines. The B3 pin of the plug 100 is a pin corresponding to a signal line TX2$n$ (also referred to as TX2−) among the SuperSpeed signal lines. The B10 pin of the plug 100 is a pin corresponding to a signal line RX1$n$ (also referred to as RX1−) among the SuperSpeed signal lines. The B11 pin of the plug 100 is a pin corresponding to a signal line RX1$p$ (also referred to as RX1+) among the SuperSpeed signal lines.

On the other hand, the A6 pin and the A7 pin of the plug 100 are pins corresponding to a low-speed signal line used for low-speed communication slower than the high-speed communication. More specifically, in the present embodiment, the electronic apparatus is configured to be capable of performing serial communication in which a signal is differentially transmitted by two signal lines Dp (also referred to as D+) and Dn (also referred to as D−) with the external apparatus such as the power supply unit 10 as low-speed communication that does not use the SuperSpeed signal lines. Then, the A6 pin of the plug 100 is a pin corresponding to the signal line Dp, and the A7 pin of the plug 100 is a pin corresponding to the signal line Dn.

The A5 pin of the plug 100 is a pin used to detect whether the plug 100 is inserted into a receptacle such as the charging terminal 43 in the upside-up direction or in the upside-down direction. More specifically, the A5 pin of the plug 100 is a configuration channel (CC) pin.

The B5 pin of the plug 100 is a pin used to supply power to the cable (for example, the E-Marked cable) including the plug 100. More specifically, the B5 pin of the plug 100 is a Vconn pin, and is used to supply power (hereinafter, also referred to as Vconn power supply) for causing the eMarker of the E-Marked cable including the plug 100 to function.

In the plug 100, roles of the A5 pin and the B5 pin (that is, an output from the A5 pin and an output from the B5 pin) can be appropriately changed by the electronic apparatus. More specifically, when the plug 100 is inserted into the charging terminal 43 or the like in the upside-up direction, the A5 pin of the plug 100 is used as the CC pin, and the B5 pin of the plug 100 is used as the Vconn pin. On the other hand, when the plug 100 is inserted into the charging terminal 43 or the like in the upside-down direction, the A5 pin of the plug 100 is used as the Vconn pin, and the B5 pin of the plug 100 is used as the CC pin.

The A8 pin and the B8 pin of the plug 100 are pins corresponding to auxiliary signal lines. More specifically, the A8 pin of the plug 100 is a pin corresponding to a signal line SBU1 used for communication in an alternate mode that is an optional function of USB Type-C. Further, the B8 pin of the plug 100 is a pin corresponding to a signal line SBU2 used for the communication in the alternate mode.

(Connection Relationship of Pins when Plug is Inserted into Charging Terminal in Upside-Up Direction)

Next, a connection relationship between each pin of the charging terminal 43 and each pin of the plug 100 when the plug 100 is inserted into the charging terminal 43 in the upside-up direction will be described.

In a case of the upside-up, as indicated by an arrow with a reference sign α in FIG. 6, the A1 pin of the charging terminal 43 is connected to the A1 pin of the plug 100, the A12 pin of the charging terminal 43 is connected to the A12 pin of the plug 100, the B1 pin of the charging terminal 43 is connected to the B1 pin of the plug 100, and the B12 pin of the charging terminal 43 is connected to the B12 pin of the plug 100.

In the case of the upside-up, the A4 pin of the charging terminal 43 is connected to the A4 pin of the plug 100, the A9 pin of the charging terminal 43 is connected to the A9 pin of the plug 100, the B4 pin of the charging terminal 43 is connected to the B4 pin of the plug 100, and the B9 pin of the charging terminal 43 is connected to the B9 pin of the plug 100. Therefore, the power supply unit 10 can receive the USB bus power and the like supplied via the A4 pin, the A9 pin, the B4 pin, and the B9 pin of the plug 100 by the A4 pin, the A9 pin, the B4 pin, and the B9 pin of the charging terminal 43, and can charge the power supply 12 with the received power.

In the case of the upside-up, the A6 pin of the charging terminal 43 is connected to the A6 pin of the plug 100, and the A7 pin of the charging terminal 43 is connected to the A7 pin of the plug 100. Therefore, the power supply unit 10 can perform the serial communication using the two signal lines Dp and Dn, that is, the low-speed communication with the electronic apparatus.

The plug 100 does not include pins to be connected to the B6 pin and the B7 pin of the charging terminal 43 in the case of the upside-up. That is, in the case of the upside-up, the B6 pin and the B7 pin of the charging terminal 43 are not connected to any pin of the plug 100. Therefore, even when the A6 pin and the B6 pin of the charging terminal 43 are connected in parallel as shown in FIG. 4 and the like, it is possible to prevent a signal that may become noise from being input to the power supply unit 10 (for example, the MCU 50) via the B6 pin of the charging terminal 43 in the case of the upside-up. Similarly, even when the A7 pin and the B7 pin of the charging terminal 43 are connected in parallel, it is possible to prevent the signal that may become noise from being input to the power supply unit 10 (for example, the MCU 50) via the B7 pin of the charging terminal 43 in the case of the upside-up.

In the case of the upside-up, the A5 pin of the charging terminal 43 is connected to the A5 pin of the plug 100. Therefore, the electronic apparatus or the power supply unit 10 can detect that the plug 100 is inserted into the charging terminal 43 in the upside-up direction by communication of a CC signal via the A5 pin of the charging terminal 43 and the A5 pin of the plug 100.

In the case of the upside-up, the B5 pin of the charging terminal 43 is connected to the B5 pin of the plug 100. Therefore, the power supply unit 10 can receive the Vconn power supplied via the B5 pin of the plug 100 by the B5 pin of the charging terminal 43.

In the case of the upside-up, the A8 pin of the charging terminal 43 is connected to the A8 pin of the plug 100, and the B8 pin of the charging terminal 43 is connected to the B8 pin of the plug 100. However, as described above, the A8 pin and the B8 pin of the charging terminal 43 are not connected to the electric circuit of the power supply unit 10 (for example, an electric circuit of the circuit board 60). Therefore, auxiliary signals (for example, a signal of the SBU1 and a signal of the SBU2) output from the A8 pin and the B8 pin of the plug 100 are not input to the power supply unit 10.

The charging terminal 43 does not include pins connected to the A2 pin, the A3 pin, the A10 pin, the A11 pin, the B2 pin, the B3 pin, the B10 pin, and the B11 pin of the plug 100 in the case of the upside-up. That is, in the case of the upside-up, the A2 pin, the A3 pin, the A10 pin, the A11 pin, the B2 pin, the B3 pin, the B10 pin, and the B11 pin of the plug 100 are not connected to any pin of the charging terminal 43. Therefore, in the case of the upside-down, a signal for high-speed communication using the A2 pin, the A3 pin, the A10 pin, the A11 pin, the B2 pin, the B3 pin, the B10 pin, the B11 pin, and the like of the plug 100 is not input to the power supply unit 10.

(Connection Relationship of Pins when Plug is Inserted into Charging Terminal in Upside-Down Direction)

Next, a connection relationship between each pin of the charging terminal 43 and each pin of the plug 100 when the plug 100 is inserted into the charging terminal 43 in the upside-down direction will be described.

In a case of the upside-down, as indicated by an arrow with a reference sign 13 in FIG. 6, the A1 pin of the charging terminal 43 is connected to the B1 pin of the plug 100, the A12 pin of the charging terminal 43 is connected to the B12 pin of the plug 100, the B1 pin of the charging terminal 43 is connected to the A1 pin of the plug 100, and the B12 pin of the charging terminal 43 is connected to the A12 pin of the plug 100.

In the case of the upside-down, the A4 pin of the charging terminal 43 is connected to the B4 pin of the plug 100, the A9 pin of the charging terminal 43 is connected to the B9 pin of the plug 100, the B4 pin of the charging terminal 43 is connected to the A4 pin of the plug 100, and the B9 pin of the charging terminal 43 is connected to the A9 pin of the plug 100. Therefore, the power supply unit 10 can receive the USB bus power and the like supplied via the A4 pin, the A9 pin, the B4 pin, and the B9 pin of the plug 100 by the B4 pin, the B9 pin, the A4 pin, and the A9 pin of the charging terminal 43, and can charge the power supply 12 with the received power.

In the case of the upside-down, the A6 pin of the charging terminal 43 is connected to the B6 pin of the plug 100, and the A7 pin of the charging terminal 43 is connected to the B7 pin of the plug 100. Therefore, the power supply unit 10 can perform the serial communication using the two signal lines Dp and Dn, that is, the low-speed communication with the electronic apparatus.

Further, the plug 100 does not include pins to be connected to the A6 pin and the A7 pin of the charging terminal 43 in the case of the upside-down. That is, in the case of the upside-down, the A6 pin and the A7 pin of the charging terminal 43 are not connected to any pin of the plug 100. Therefore, even when the A6 pin and the B6 pin of the charging terminal 43 are connected in parallel as shown in FIG. 4 and the like, it is possible to prevent the signal that may become noise from being input to the power supply unit 10 (for example, the MCU 50) via the A6 pin of the charging terminal 43 in the case of the upside-down. Similarly, even when the A7 pin and the B7 pin of the charging terminal 43 are connected in parallel, it is possible to prevent the signal that may become noise from being input to the power supply unit 10 (for example, the MCU 50) via the A7 pin of the charging terminal 43 in the case of the upside-down.

In the case of the upside-down, the A5 pin of the charging terminal 43 is connected to the B5 pin of the plug 100. Therefore, the electronic apparatus or the power supply unit 10 can detect that the plug 100 is inserted into the charging terminal 43 in the upside-down direction by communication of a CC signal via the A5 pin of the charging terminal 43 and the B5 pin of the plug 100.

In the case of the upside-down, the B5 pin of the charging terminal 43 is connected to the A5 pin of the plug 100. Therefore, the power supply unit 10 can receive the Vconn power supplied via the A5 pin of the plug 100 by the B5 pin of the charging terminal 43.

In the case of the upside-down, the A8 pin of the charging terminal 43 is connected to the B8 pin of the plug 100, and the B8 pin of the charging terminal 43 is connected to the A8 pin of the plug 100. However, as described above, the A8 pin and the B8 pin of the charging terminal 43 are not connected to the electric circuit of the power supply unit 10 (for example, the electric circuit of the circuit board 60). Therefore, the auxiliary signals (for example, the signal of the SBU1 and the signal of the SBU2) output from the A8 pin and the B8 pin of the plug 100 are not input to the power supply unit 10.

The charging terminal 43 does not include pins connected to the A2 pin, the A3 pin, the A10 pin, the A11 pin, the B2 pin, the B3 pin, the B10 pin, and the B11 pin of the plug 100 even in the case of the upside-down. That is, also in the case of the upside-down, the A2 pin, the A3 pin, the A10 pin, the A11 pin, the B2 pin, the B3 pin, the B10 pin, and the B11 pin of the plug 100 are not connected to any pin of the charging terminal 43. Therefore, also in the case of the upside-down, the signal for the high-speed communication using the A2 pin, the A3 pin, the A10 pin, the A11 pin, the B2 pin, the B3 pin, the B10 pin, the B11 pin, and the like of the plug 100 is not input to the power supply unit 10.

As described above, the charging terminal 43 includes pins that can be connected to only some of the plurality of pins provided in the plug 100. Specifically, the charging terminal 43 includes pins respectively connected to the A1 pin, the A4 pin, the A5 pin, the A6 pin, the A7 pin, the A8 pin, the A9 pin, the A12 pin, the B1 pin, the B4 pin, the B5 pin, the B8 pin, the B9 pin, and the B12 pin of the plug 100, but does not include pins respectively connected to the A2 pin, the A3 pin, the A10 pin, the A11 pin, the B2 pin, the B3 pin, the B10 pin, and the B11 pin of the plug 100.

It is assumed that the charging terminal 43 includes pins connected to pins provided in the plug 100. In this case, a large number of pins are required for the charging terminal 43, and the number of wirings (particularly, the ground line 60N) for connecting the pins of the charging terminal 43 to the electric circuit of the power supply unit 10 (for example, the electric circuit of the circuit board 60) is also increased. Therefore, it is assumed that the configurations of the charging terminal 43 and the electric circuit of the circuit board 60 become complicated, a mounting area of the charging terminal 43 is increased, and the manufacturing cost of the power supply unit 10 (that is, the aerosol inhaler 1) is increased. Here, the mounting area of the charging terminal 43 is an area required for mounting the charging terminal 43 on the circuit board 60, and is, for example, an area including an area required for mounting the charging terminal 43 itself on the circuit board 60 and an area of a wiring portion that connects the pins of the charging terminal 43 to the electric circuit of the circuit board 60. Then, an increase in the mounting area of the charging terminal 43 leads to an increase in a size of the power supply unit 10 and a size of the aerosol inhaler 1.

Therefore, in the present embodiment, the charging terminal 43 includes pins connected to only some of the pins of the plug 100. Accordingly, the configurations of the charging terminal 43 and the electric circuit of the circuit board 60 are prevented from becoming complicated, the mounting area of the charging terminal 43 can be reduced, and the power supply unit 10 and the aerosol inhaler 1 can be miniaturized. Further, by preventing complication of the configurations of the charging terminal 43 and the electric circuit of the circuit board 60, the manufacturing cost of the power supply unit 10 (that is, the aerosol inhaler 1) can also be reduced.

More specifically, the charging terminal 43 includes pins connected to the A4 pin, the A9 pin, the B4 pin, and the B9 pin that are pins corresponding to power lines provided in the plug 100. Accordingly, the power supply unit 10 can receive power supply from the plug 100 by the charging terminal 43, and can charge the power supply 12 with the received power. That is, since the charging terminal 43 includes pins for implementing functions required in the current power supply unit 10, it is possible to prevent a decrease in user convenience due to a reduction of such pins.

On the other hand, a signal communicated by pins corresponding to the high-speed signal line or pins corresponding to the auxiliary signal line among the pins provided in the plug 100 is less likely to be used at least in the current power supply unit 10. Therefore, by not providing the charging terminal 43 with pins connected to the pins corresponding to the high-speed signal line or the pins corresponding to the auxiliary signal line of the plug 100, it is possible to reduce the number of pins for implementing an excessive function at least for the current power supply unit 10. Accordingly, the mounting area of the charging terminal 43 can be appropriately reduced.

Particularly, the pins corresponding to the high-speed signal line of the plug 100 are configured with a large number of pins. Therefore, by not providing the charging terminal 43 with the pins connected to the pins corresponding to the high-speed signal line of the plug 100, the pins of the charging terminal 43 and a wiring that connects the pins of the charging terminal 43 to the electric circuit of the circuit board 60 can be reduced accordingly. Therefore, the mounting area of the charging terminal 43 can be further reduced, the power supply unit 10 and the aerosol inhaler 1 can be miniaturized, and the manufacturing cost can be reduced.

On the other hand, the pins corresponding to the low-speed signal line of the plug 100 are configured with fewer pins than the pins corresponding to the high-speed signal line. Therefore, by providing the charging terminal 43 with pins connected to the pins corresponding to the low-speed signal line of the plug 100, communication between the power supply unit 10 and the electronic apparatus can be implemented with a small number of pins and wirings. That is, it is possible to configure the power supply unit 10 to have a function (for example, a function that may be used) required by the current power supply unit 10 while preventing an increase in the mounting area of the charging terminal 43, and it is possible to improve the user convenience. More specifically, for example, the power supply unit 10 can receive new firmware from the electronic apparatus by the low-speed communication and update the firmware. Accordingly, it is possible to improve performance of the power supply unit 10 and stabilize the operation of the power supply unit 10, improve the user convenience, and improve satisfaction of the user with the aerosol inhaler 1.

The A6 pin and the B6 pin of the charging terminal 43, which can be connected to the pins corresponding to the low-speed signal line of the plug 100, are connected in parallel on the circuit board 60, and the variable resistor VR2 is connected in parallel to the A6 pin and the B6 pin connected in parallel. Accordingly, compared with a case where protection elements are individually connected to the A6 pin and the B6 pin of the charging terminal 43, the system (for example, the MCU 50) of the power supply unit 10 can be protected from noise (for example, static electricity) that can be input via these pins by a small number of protection elements. That is, while appropriately protecting the system of the power supply unit 10, it is possible to reduce the number of protection elements to miniaturize the power supply unit 10 and the aerosol inhaler 1 and reduce the manufacturing cost.

Similarly, the A7 pin and the B7 pin of the charging terminal 43, which can be connected to the pins corresponding to the low-speed signal line of the plug 100, are also connected in parallel on the circuit board 60, and the variable resistor VR3 is connected in parallel to the A7 pin and the B7 pin connected in parallel. Therefore, while appropriately protecting the system of the power supply unit 10, it is possible to reduce the number of protection elements to miniaturize the power supply unit 10 and the aerosol inhaler 1 and reduce the manufacturing cost.

The charging terminal 43 includes the A8 pin and the B8 pin that are not connected to the electric circuit of the circuit board 60, that is, other elements mounted on the circuit board 60. Accordingly, in consideration of a future expansion of the function of the aerosol inhaler 1, it is possible to reduce a wiring for connecting these pins to other elements at present while leaving the A8 pin and the B8 pin that can be connected to the A8 pin and the B8 pin of the plug 100. Therefore, it is possible to reduce the mounting area of the charging terminal 43, miniaturize the power supply unit 10 and the aerosol inhaler 1, and reduce the manufacturing cost.

As described above, by reducing the mounting area of the charging terminal 43, it is possible to also miniaturize the circuit board 60 itself. Therefore, the circuit board 60 can be formed in the substantially L-shape as shown in FIG. 2. Then, as described above, by forming the circuit board 60 in the substantially L-shape, it is possible to implement the aerosol inhaler 1 that fits in the hand of the general adult, that is, the aerosol inhaler 1 easy for the user to hold. Hereinafter, a specific example of the circuit board 60 of the present embodiment will be described with reference to FIGS. 2 and 7 to 10. It should be noted that FIGS. 7 to 10 disclose only main parts of the circuit configuration of the circuit board 60.

(Circuit Board)

As shown in FIG. 2, the circuit board 60 includes a first surface 71 and a second surface 72 positioned on a back side of the first surface 71. The first surface 71 and the second surface 72 are surfaces substantially perpendicular to the left-right direction. Then, the first surface 71 constitutes a right surface of the circuit board 60, and the second surface 72 constitutes a left surface of the circuit board 60. Then, the second surface 72 faces the power supply 12, and/or the second surface 72 is disposed closer to the power supply 12 than the first surface 71. In the present embodiment, the second surface 72 faces the power supply 12.

A plurality of elements are mounted on the first surface 71 that constitutes the right surface of the circuit board 60 and the second surface 72 that constitutes the left surface of the circuit board 60.

As shown in FIGS. 7 to 10, the circuit board 60 further includes a ground layer 73 and a power supply layer 74, and the ground layer 73 and the power supply layer 74 are provided between the first surface 71 and the second surface 72. That is, in the present embodiment, the circuit board 60 is a four-layer multilayer board in which the first surface 71, the ground layer 73, the power supply layer 74, and the second surface 72 are stacked. In the present embodiment, the circuit board 60 is configured by stacking the first surface 71, the ground layer 73, the power supply layer 74, and the second surface 72 in this order from a right side. Instead of the present embodiment, the circuit board 60 may be a multilayer board having five or more layers by having at least one of the first surface 71, the ground layer 73, the power supply layer 74, and the second surface 72 having multiple layers. Further, the first surface 71, the ground layer 73, the power supply layer 74, and the second surface 72 may be divided into two or more groups, and may be stacked only in the same group. It should be noted that, in this case, the circuit board 60 is physically divided into two or more, but an order in which the first surface 71, the ground layer 73, the power supply layer 74, and the second surface 72 are arranged in the left-right direction is not changed.

The circuit board 60 has a substantially L shape as a whole when viewed from the left-right direction substantially perpendicular to the first surface 71 and the second surface 72 on which the plurality of elements are mounted. Specifically, when viewed from the left-right direction, the circuit board 60 includes a coupling portion 600 having a substantially quadrangular shape, a first portion 601 that extends forward from a front end surface of the coupling portion 600, and a second portion 602 that extends upward from an upper end surface of the coupling portion 600. The first surface 71, the ground layer 73, the power supply layer 74, and the second surface 72 have substantially the same shape, and are substantially L-shaped when viewed from the left-right direction. Specifically, when viewed from the left-right direction, the first surface 71 includes a coupling portion 710 having a substantially quadrangular shape, a first portion 711 that extends forward from a front end portion of the coupling portion 710, and a second portion 712 that extends upward from an upper end surface of the coupling portion 710. When viewed from the left-right direction, the second surface 72 includes a coupling portion 720 having a substantially quadrangular shape, a first portion 721 that extends forward from a front end portion of the coupling portion 720, and a second portion 722 that extends upward from an upper end surface of the coupling portion 720. When viewed from the left-right direction, the ground layer 73 includes a coupling portion 730 having a substantially quadrangular shape, a first portion 731 that extends forward from a front end portion of the coupling portion 730, and a second portion 732 that extends upward from an upper end surface of the coupling portion 730. When viewed from the left-right direction, the power supply layer 74 includes a coupling portion 740 having a substantially quadrangular shape, a first portion 741 that extends forward from a front end portion of the coupling portion 740, and a second portion 742 that extends upward from an upper end surface of the coupling portion 740. The coupling portion 600 of the circuit board 60 is formed by the coupling portions 710, 730, 740, and 720 respectively of the first surface 71, the ground layer 73, the power supply layer 74, and the second surface 72. The first portion 601 of the circuit board 60 is formed by the first portions 711, 731, 741, and 721 respectively of the first surface 71, the ground layer 73, the power supply layer 74, and the second surface 72. The second portion 602 is formed by the second portions 712, 732, 742, and 722 respectively of the first surface 71, the ground layer 73, the power supply layer 74, and the second surface 72.

Figure 7:
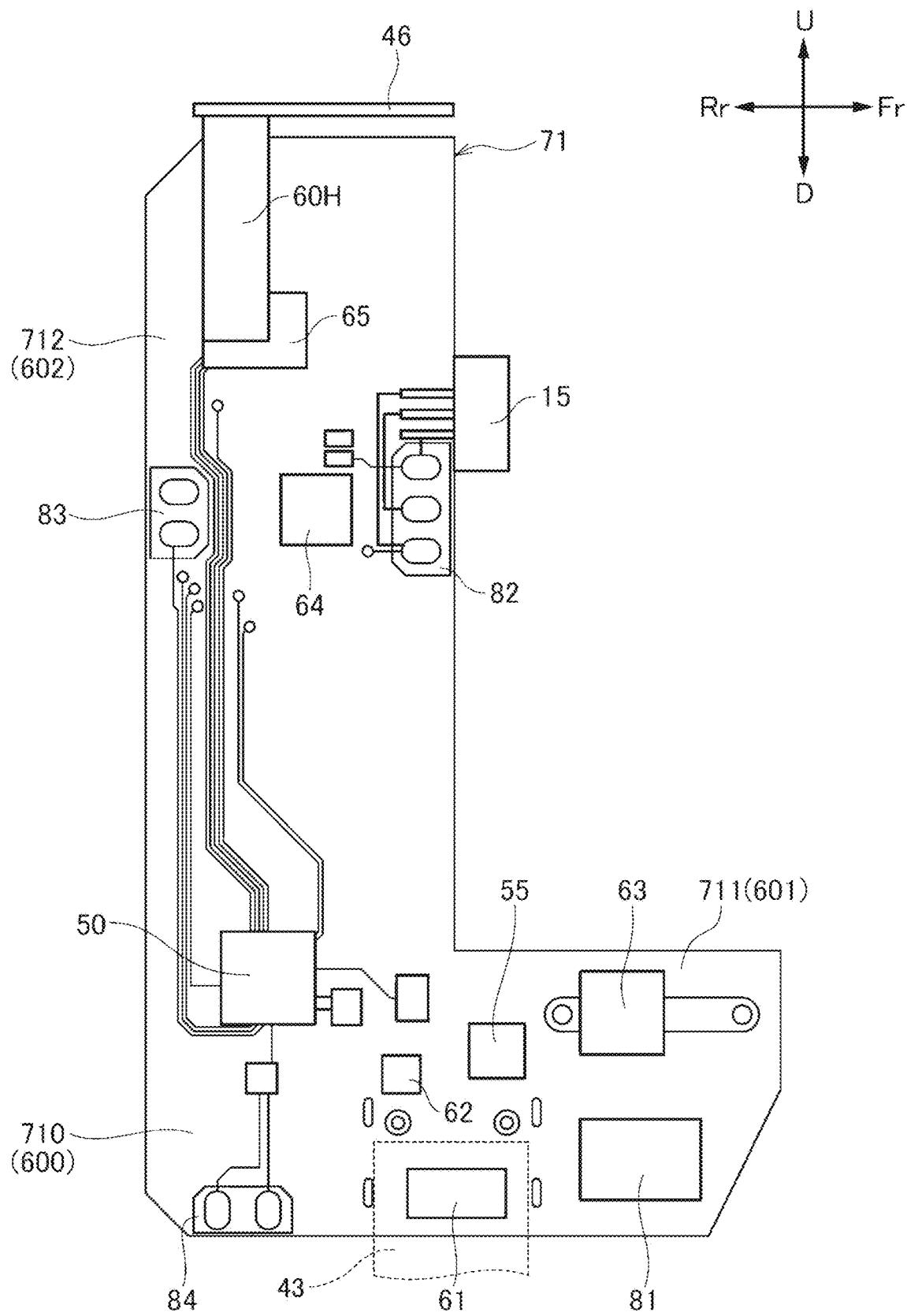
FIG. 7 is a schematic view showing main parts of the circuit configuration when a first surface of a circuit board of the aerosol inhaler of FIG. 1 is viewed from a right side.

As shown in FIG. 7, elements such as the display driver 65, the second DC/DC converter 64, the MCU 50, the charging IC 55, the LDO regulator 62, the protection IC 61, the first DC/DC converter 63, and a power supply connector 81 are mounted on the first surface 71 of the circuit board 60. Further, an intake sensor connection portion 82, a switch connection portion 83, and a vibrator connection portion 84 are formed on the first surface 71 of the circuit board 60.

The display driver 65 is mounted above a center of the second portion 712 in the upper-lower direction. The OLED panel 46 is disposed above the circuit board 60, and the display driver 65 and the OLED panel 46 are connected by the power supply line 60H.

The second DC/DC converter 64 is mounted slightly above the center of the second portion 712 in the upper-lower direction and in front of and below the display driver 65.

The MCU 50 is mounted at a position that straddles a lower end portion of the second portion 712 and an upper end portion of the coupling portion 710.

The charging IC 55 is mounted on a rear end portion of the first portion 711.

Accordingly, the charging IC 55 is mounted on the first surface 71 positioned on the back side of the second surface 72 that faces the power supply 12 and/or is disposed close to the power supply 12. Accordingly, the power supply 12 can be prevented from being heated by heat generated by the charging IC 55 during charging of the power supply 12.

The LDO regulator 62 is mounted between the MCU 50 and the charging IC 55 in the front-rear direction at a substantially central portion of the coupling portion 710 in the upper-lower direction.

Accordingly, the LDO regulator 62 is mounted on the first surface 71 positioned on the back side of the second surface 72 that faces the power supply 12 and/or is disposed close to the power supply 12. Accordingly, the power supply 12 can be prevented from being heated by heat generated by the LDO regulator 62 during the charging of the power supply 12.

The protection IC 61 is mounted at a position that is below the charging IC 55 and the LDO regulator 62 and straddles the coupling portion 710 and the first portion 711.

The first DC/DC converter 63 is mounted on a front upper end portion of the first portion 711.

Accordingly, the first DC/DC converter 63 is mounted on the first surface 71 positioned on the back side of the second surface 72 that faces the power supply 12 and/or is disposed close to the power supply 12. Therefore, the power supply 12 can be prevented from being heated by heat generated when the first DC/DC converter 63 functions.

The power supply connector 81 is a connector for electrically connecting the circuit board 60 to the power supply 12, and is mounted below the first DC/DC converter 63 and on a lower end portion of the first portion 711. A power line connected to the power supply 12 is connected to the power supply connector 81. Further, the power supply connector 81 and the charging IC 55 are mounted on one of left and right sides (a right side in the present embodiment, that is, a front side of the aerosol inhaler 1) when viewed from a position where the charging terminal 43 is mounted on the circuit board 60. Accordingly, the power supply connector 81, which is an element for charging the power supply 12, and the charging IC 55 can be integrated and mounted on the circuit board 60, and the circuit board 60 can be miniaturized and charging efficiency can be improved.

The intake sensor connection portion 82 is formed at a substantially central portion in the upper-lower direction of a front end portion of the second portion 712. A power line connected to the intake sensor 15 is soldered to the intake sensor connection portion 82.

The switch connection portion 83 is formed at a substantially central portion in the upper-lower direction of a rear end portion of the second portion 712. A power line connected to the operation unit 18 is soldered to the switch connection portion 83.

The vibrator connection portion 84 is formed at a rear lower end portion of the coupling portion 710. A power line connected to the positive electrode side terminal 47a and the negative electrode side terminal 47b of the vibrator 47 is soldered to the vibrator connection portion 84.

Therefore, the first DC/DC converter 63 and the second DC/DC converter 64 are mounted on the circuit board 60 such that the first DC/DC converter 63 and the second DC/DC converter 64 are separated from each other. More specifically, the first DC/DC converter 63 is mounted on the first portion 601 of the circuit board 60, and the second DC/DC converter 64 is mounted on the second portion 602 of the circuit board 60. Further, the first DC/DC converter 63 is mounted on the first portion 601 of the circuit board 60, the second DC/DC converter 64 is mounted on the second portion 602 of the circuit board 60, and the MCU 50 is mounted at the position that straddles the lower end portion of the second portion 712 and the upper end portion of the coupling portion 710 of the circuit board 60. Accordingly, a distance between the first DC/DC converter 63 and the second DC/DC converter 64 is longer than a distance between the first DC/DC converter 63 and the MCU 50 and longer than a distance between the second DC/DC converter 64 and the MCU 50. The term "distance" here refers to a shortest distance by which two objects are connected with a straight line (that is, a straight-line distance). The same applies to the following description.

Accordingly, since the first DC/DC converter 63 and the second DC/DC converter 64 are mounted on the circuit board 60 such that the first DC/DC converter 63 and the second DC/DC converter 64 are separated from each other, the first DC/DC converter 63 and the second DC/DC converter 64 can reduce an influence of heat or switching noise generated by one of the DC/DC converters on the other DC/DC converter.

Since both the first DC/DC converter 63 and the second DC/DC converter 64 are mounted on the first surface 71 of the circuit board 60, the first DC/DC converter 63 and the second DC/DC converter 64 are arranged on the same surface. The second surface 72 on which the first DC/DC converter 63 and the second DC/DC converter 64 are not mounted can be less likely to be influenced by the heat or the switching noise generated by the DC/DC converter.

Figure 10:
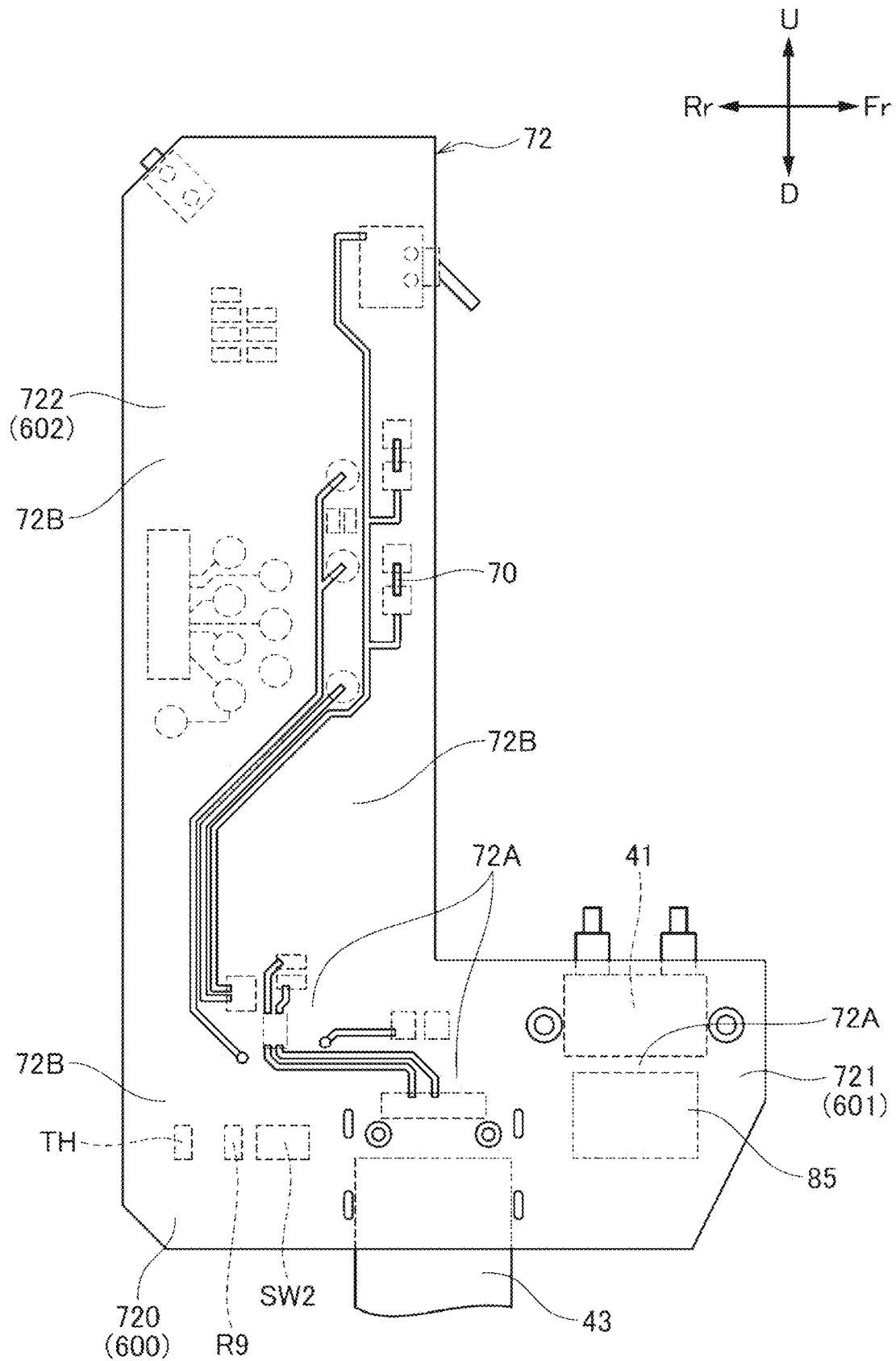
FIG. 10 is a schematic view showing main parts of the circuit configuration when a second surface of the circuit board of the aerosol inhaler of FIG. 1 is viewed from the right side.

As shown in FIG. 10, the LED 70, the discharging terminal 41, a power module 85, the charging terminal 43, and the thermistor TH are mounted on the second surface 72 of the circuit board 60.

The LED 70 is mounted on a substantially central portion in the upper-lower direction of a rear end portion of the second portion 722.

The discharging terminal 41 is mounted so as to protrude upward from an upper end portion of the first portion 721. The discharging terminal 41 is a pin or the like with a built-in spring, is connected to the load 21 of the first cartridge 20, and power of the power supply 12 is supplied from the discharging terminal 41 to the load 21.

The power module 85 is mounted on the first portion 721 below the discharging terminal 41. The power module 85 includes the switch SW4, the capacitor CD10, and the variable resistor VR4. Further, although the power module 85 includes the switch SW4, the power module 85 may include no capacitor CD10 and no variable resistor VR4. In this case, the capacitor CD10 and the variable resistor VR4 may be provided between the discharging terminal 41 and the power module 85.

The charging terminal 43 is mounted so as to protrude downward from a lower end portion of the second surface 72 at a position that straddles the coupling portion 720 and the first portion 721 in the front-rear direction.

Further, when viewed from the left-right direction, on the first surface 71 positioned on the back side of the second surface 72, at least a part of the protection IC 61 is mounted on a region overlapping the charging terminal 43 mounted on the second surface 72 (see FIG. 7).

Accordingly, the elements can be mounted on the circuit board 60 at a high density, and the circuit board 60 can be further miniaturized.

The thermistor TH is mounted on a region on a rear side and a lower side of the coupling portion 720. Therefore, the thermistor TH is mounted on a rear lower end portion of the entire second surface 72.

Since the thermistor TH is mounted on the second surface 72 that faces the power supply 12 and/or is disposed closer to the power supply 12 than the first surface 71, the thermistor TH can be disposed so as to face the power supply 12 and/or disposed close to the power supply 12. Accordingly, the thermistor TH can detect a temperature of the power supply 12 more accurately.

The thermistor TH and the resistor R9 form the thermistor circuit C2 on the second surface 72. The resistor R9 is mounted on the second surface 72 in front of the thermistor TH. The thermistor TH is disposed away from the resistor R9, and at least one of the plurality of elements is mounted at a position where a straight-line distance starting from the resistor R9 is shorter than a straight-line distance between the resistor R9 and the thermistor TH. In the present embodiment, the switch SW2 is mounted at the position where the straight-line distance starting from the resistor R9 is shorter than the straight-line distance between the resistor R9 and the thermistor TH.

Accordingly, since the thermistor TH is mounted on the second surface 72 away from the resistor R9, the thermistor TH is less likely to be influenced by heat generated by the resistor R9. Accordingly, the thermistor TH can detect a temperature of the power supply 12 more accurately.

Since the thermistor TH is mounted on the second surface 72 different from the first surface 71 on which the MCU 50 is mounted, the thermistor TH is less likely to be influenced by heat generated by the MCU 50. Accordingly, the thermistor TH can detect a temperature of the power supply 12 more accurately.

Since the first DC/DC converter 63 is mounted on the first surface 71 different from the second surface 72 on which the thermistor TH is mounted, the thermistor TH is less likely to be influenced by heat generated by the first DC/DC converter 63. Accordingly, the thermistor TH can detect a temperature of the power supply 12 more accurately.

Since the LDO regulator 62 is mounted on the first surface 71 different from the second surface 72 on which the thermistor TH is mounted, the thermistor TH is less likely to be influenced by heat generated by the LDO regulator 62. Accordingly, the thermistor TH can detect a temperature of the power supply 12 more accurately.

Since the charging IC 55 is mounted on the first surface 71 different from the second surface 72 on which the thermistor TH is mounted, the thermistor TH is less likely to be influenced by heat generated by the charging IC 55. Accordingly, the thermistor TH can detect a temperature of the power supply 12 more accurately.

Both the first DC/DC converter 63 and the discharging terminal 41 connected to the load 21 that functions by consuming power output by the first DC/DC converter 63 are mounted on the first portion 601 of the circuit board 60. Both the second DC/DC converter 64 and the display driver 65 connected to the OLED panel 46 that functions by consuming power output by the second DC/DC converter 64 are mounted on the second portion 602 of the circuit board 60.

The discharging terminal 41 is not necessarily mounted on the first portion 601 of the circuit board 60. For example, the discharging terminal 41 may be mounted on a portion of the circuit board 60 other than the first portion 601 and connected to an element mounted on the first portion 601. Further, the display driver 65 is not necessarily mounted on the second portion 602 of the circuit board 60. For example, the display driver 65 may be mounted on a portion of the circuit board 60 other than the second portion 602, and connected to an element mounted on the second portion 602.

Accordingly, since the discharging terminal 41 is mounted on or connected to the first portion 601 of the circuit board 60 and the display driver 65 is mounted on or connected to the second portion 602 of the circuit board 60, the discharging terminal 41 can be disposed close to the first DC/DC converter 63 and the display driver 65 can be disposed close to the second DC/DC converter 64. Therefore, it is possible to shorten a path for supplying power boosted by the first DC/DC converter 63 to the load 21, and it is possible to shorten a path for supplying power boosted by the second DC/DC converter 64 to the OLED panel 46. Accordingly, it is possible to reduce a loss of the power boosted by the first DC/DC converter 63 and the second DC/DC converter 64.

Then, it is possible to prevent an influence of the loss of the power boosted by the first DC/DC converter 63 and the second DC/DC converter 64 on other elements, and it is possible to prevent a decrease in an amount of an aerosol that can be generated by one charging.

The first DC/DC converter 63 is mounted on the first surface 71, and the power module 85 is mounted on the second surface 72. Accordingly, since the first DC/DC converter 63 and the power module 85 are mounted on different surfaces of the circuit board 60, it is possible to prevent concentration of the heat generated by the first DC/DC converter 63 and heat generated by the power module 85 during power supply to the load 21.

Since the power module 85 and the discharging terminal 41 are both mounted on the first portion 721 of the second surface 72, the power module 85 and the discharging terminal 41 are mounted close to each other. Accordingly, a length of a portion of the power supply line 60F that electrically connects the power module 85 and the discharging terminal 41 can be shortened, and a power loss between the power module 85 and the discharging terminal 41 can be reduced. Further, a pulsed current flows through the portion of the power supply line 60F that electrically connects the power module 85 and the discharging terminal 41. Therefore, by shortening the length of the portion of the power supply line 60F that electrically connects the power module 85 and the discharging terminal 41, it is possible to prevent an influence of the pulsed current on other elements.

No element is mounted in a region overlapping the thermistor TH mounted on the second surface 72 on the first surface 71 positioned on the back side of the second surface 72 when viewed from the left-right direction.

Therefore, the thermistor TH is less likely to be influenced by heat generated by the elements mounted on the first surface 71 positioned on the back side of the second surface 72. Accordingly, the thermistor TH can detect a temperature of the power supply 12 more accurately.

The second surface 72 includes high-density regions 72A where a large number of elements are mounted and a mounting density of the mounted elements is high, and low-density regions 72B where a mounting density of mounted elements is lower than those of the high-density regions 72A. In the present embodiment, the first portion 721, a region on an upper side of the coupling portion 720, and a region in the vicinity of a center in the upper-lower direction of the coupling portion 720 between the coupling portion 720 and the first portion 721 are the high-density regions 72A. In the present embodiment, the thermistor TH is mounted in the region on the rear side and the lower side of the coupling portion 720 that is one of the low-density regions 72B where the mounting density of the mounted elements is lower than those of the high-density regions 72A. In the present embodiment, in addition to the region on the rear side and the lower side of the coupling portion 720, a region on a lower side of the second portion 722, and a region on the rear side and an upper side of the second portion 722 are the low-density regions 72B.

Therefore, since the thermistor TH is mounted in the region where the mounting density of the mounted elements is low, the thermistor TH is less likely to be influenced by heat generated by other elements mounted on the circuit board 60. Accordingly, the thermistor TH can detect a temperature of the power supply 12 more accurately.

Figure 8:
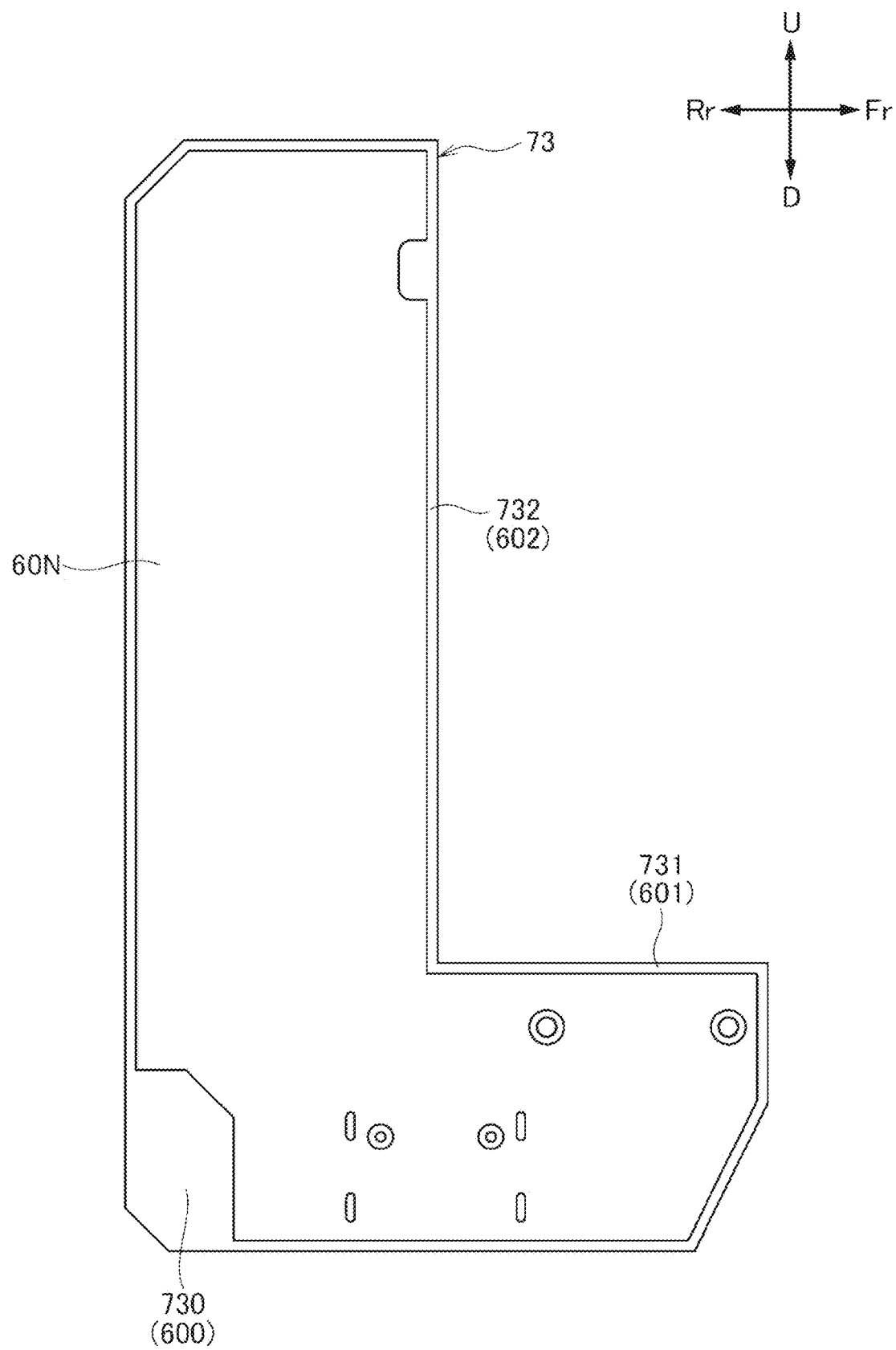
FIG. 8 is a schematic view showing main parts of the circuit configuration when a ground layer of the circuit board of the aerosol inhaler of FIG. 1 is viewed from the right side.

As shown in FIG. 8, the ground line 60N is formed on the ground layer 73 of the circuit board 60. In the present embodiment, the ground line 60N is a conductive thin film formed on the ground layer 73 of the circuit board 60, and has a reference potential of the circuit board 60.

The ground line 60N is not formed in a region overlapping the thermistor TH mounted on the second surface 72 when viewed from the left-right direction. Therefore, the thermistor TH is less likely to be influenced by heat generated by the ground line 60N. Accordingly, the thermistor TH can detect a temperature of the power supply 12 more accurately.

The ground line 60N is not formed in a region of a rear lower end of the ground layer 73 including the region overlapping the thermistor TH mounted on the second surface 72 when viewed from the left-right direction. In other words, the ground line 60N has a shape obtained by cutting out the region of the rear lower end of the ground layer 73 when viewed from the left-right direction. Therefore, when viewed from the left-right direction, the ground line 60N is not formed in the region overlapping the thermistor TH, and is formed so as not to surround the thermistor TH. Therefore, the thermistor TH is further less likely to be influenced by the heat generated by the ground line 60N. Accordingly, the thermistor TH can detect a temperature of the power supply 12 more accurately.

Figure 9:
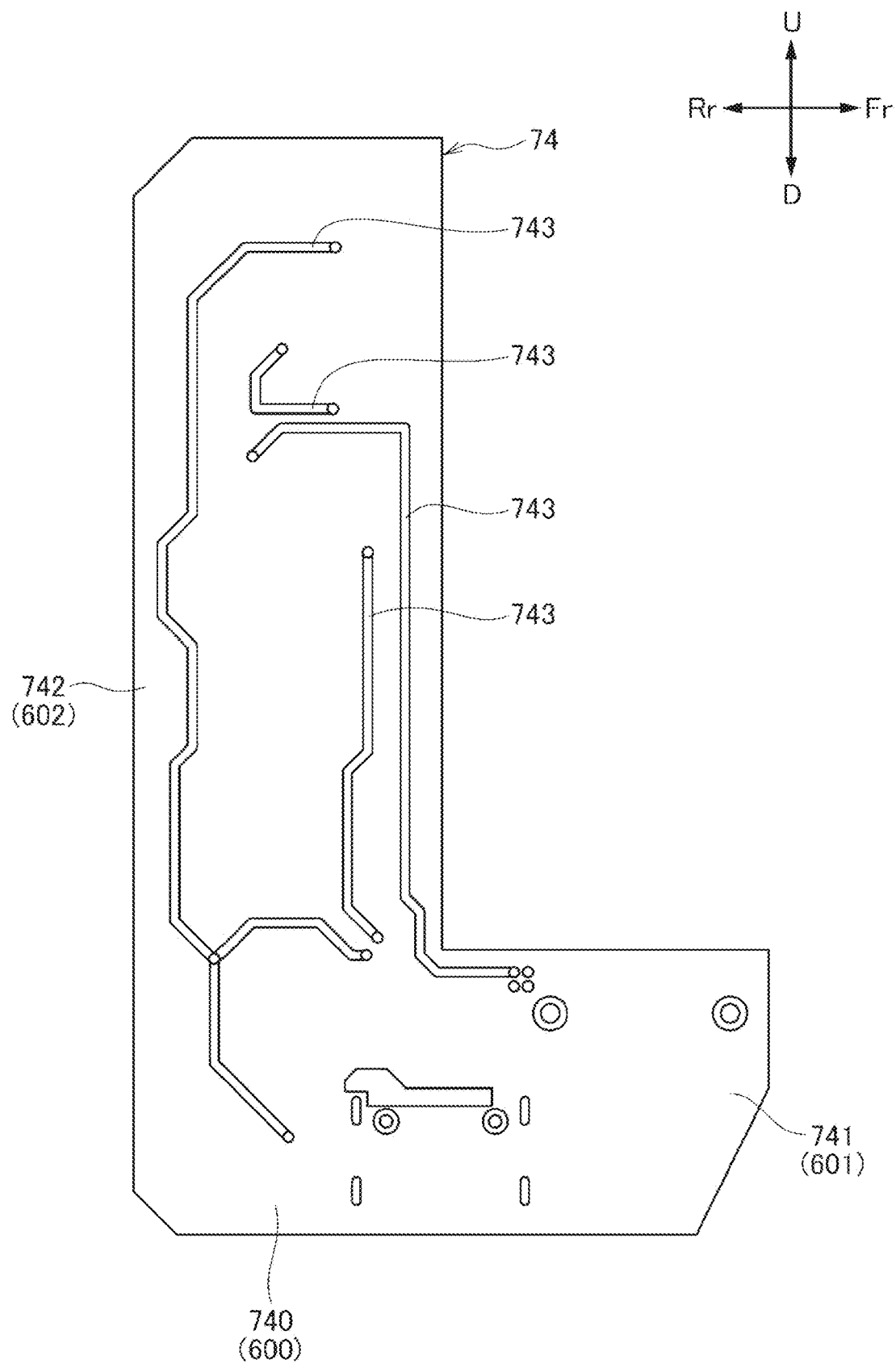
FIG. 9 is a schematic view showing main parts of the circuit configuration when a power supply layer of the circuit board of the aerosol inhaler of FIG. 1 is viewed from the right side.

As shown in FIG. 9, a power supply path 743 for supplying power to the elements mounted on the circuit board 60 is formed on the power supply layer 74 of the circuit board 60. The power supply path 743 is configured with the power supply lines 60A, 60B, 60C, 60D, 60E, 60G, and the like. The power supply path 743 is a circuit wiring of a conductor formed on the power supply layer 74 of the circuit board 60 by printing or the like.

The power supply path 743 is not formed in the region overlapping the thermistor TH mounted on the second surface 72 when viewed from the left-right direction. Therefore, the thermistor TH is less likely to be influenced by heat generated by the power supply path 743. Accordingly, the thermistor TH can detect a temperature of the power supply 12 more accurately.

The power supply path 743 is not formed in a region of a rear lower end of the power supply layer 74 including the region overlapping the thermistor TH mounted on the second surface 72 when viewed from the left-right direction. Further, the power supply path 743 is formed so as not to surround the thermistor TH when viewed from the left-right direction. Therefore, the thermistor TH is further less likely to be influenced by the heat generated by the power supply path 743. Accordingly, the thermistor TH can detect a temperature of the power supply 12 more accurately.

Accordingly, neither the ground line 60N of the ground layer 73 nor the power supply path 743 of the power supply layer 74 is formed in the region overlapping the thermistor TH mounted on the second surface 72 when viewed from the left-right direction. Therefore, the thermistor TH is less likely to be influenced by heat generated by both the ground line 60N and the power supply path 743. Accordingly, the thermistor TH can detect a temperature of the power supply 12 more accurately.

Returning to FIG. 2, the internal holder 13 holds the circuit board 60 on a right side of the partition wall 13d and holds the power supply 12 on a left side of the partition wall 13d. Accordingly, since both the circuit board 60 and the power supply 12 are held by the internal holder 13, the thermistor TH can be maintained at a position suitable for detecting a temperature of the power supply 12.

The internal holder 13 may hold only a part of the circuit board 60 on the right side of the partition wall 13d and hold only a part of the power supply 12 on the left side of the partition wall 13d. More specifically, the internal holder 13 may hold the circuit board 60 and the power supply 12 such that the position of the power supply 12 that faces the thermistor TH is exposed from the internal holder 13 in a left-right direction of the thermistor TH. In this way, since a temperature of the power supply 12 is transmitted to the thermistor TH without passing through the partition wall 13d, the thermistor TH can detect the temperature of the power supply 12 more accurately and at a high speed.

As described above, in the present embodiment, among the power supply connector 81, the MCU 50, the charging IC 55, and the charging terminal 43, the power supply connector 81, the MCU 50, and the charging IC 55 are mounted on the first surface 71 of the circuit board 60, and the charging terminal 43 is mounted on the second surface 72 of the circuit board 60. Accordingly, the charging terminal 43 and the elements for charging the power supply 12 are dispersedly mounted on both the first surface 71 and the second surface 72 of the circuit board 60, so that heat generated by the charging terminal 43 and the elements when charging the power supply 12 can be dispersed. The present invention is not limited to the example described in the present embodiment. When the charging terminal 43 and the elements for charging the power supply 12 are separately mounted on both the first surface 71 and the second surface 72, the heat generated by the charging terminal 43 and the elements when charging the power supply 12 can be dispersed. That is, for example, among the power supply connector 81, the MCU 50, the charging IC 55, and the charging terminal 43, the MCU 50 and the charging IC 55 may be mounted on the first surface 71, and the power supply connector 81 and the charging terminal 43 may be mounted on the second surface 72.

As described above, according to the power supply unit 10 of the present embodiment, the charging terminal 43 is provided with the pins connected to only some of the pins of the plug 100, so that the charging terminal 43 and the power supply unit 10 can have simple configurations, the mounting area of the charging terminal 43 can be reduced, the power supply unit 10 can be miniaturized, and the manufacturing cost can be reduced.

The present invention is not limited to the above-described embodiment, and can be appropriately modified, improved, and the like.

At least the following matters are described in the present description. Corresponding components in the above embodiment are shown in parentheses. However, the present invention is not limited thereto.

(1) A power supply unit (the power supply unit 10) for an aerosol generation device (the aerosol inhaler 1) including:

a power supply (the power supply 12) configured to supply power to a heater (the load 21) configured to heat an aerosol source (the aerosol source 22);

a receptacle (the charging terminal 43) configured to allow insertion of a plug (the plug 100) including a plurality of pins and configured to receive power for charging the power supply from the inserted plug; and a charger (the charging IC 55) configured to control charging of the power supply by power received by the receptacle, in which the receptacle includes pins connectable to only some of pins among the plurality of pins.

According to (1), since the receptacle includes the pins connectable to only some of the pins among the pins provided in the plug, it is possible to prevent configurations of electric circuits of the receptacle and the power supply unit from becoming complicated, to reduce the mounting area of the receptacle, to miniaturize the power supply unit, and thus to miniaturize the aerosol generation device. Further, when the receptacle is configured such that a widely used plug can be inserted, the power supply unit (that is, the aerosol generation device) can be easily charged at various locations (places), and an opportunity to charge the power supply unit can be secured.

(2) The power supply unit for the aerosol generation device according to (1), in which the receptacle includes a pin (the A4 pin, the A9 pin, the B4 pin, the B9 pin) connectable to a pin of a power line provided in the plug, and is configured to be unconnectable to a pin of a first signal line among a plurality of signal lines provided in the plug.

According to (2), since the receptacle is configured to be unconnectable to the pin of the first signal line among the plurality of signal lines provided in the plug, a pin and a wiring for implementing a function that may be excessive in the power supply unit can be reduced, and the mounting area of the receptacle can be appropriately reduced.

(3) The power supply unit for the aerosol generation device according to (2), in which the receptacle includes a pin (the A6 pin, the A7 pin, the B6 pin, the B7 pin) connectable to a pin of a second signal line among the plurality of signal lines, and in which the second signal line is a signal line used for communication at a speed lower than that of the first signal line.

According to (3), since the receptacle includes the pin connectable to the pin of the second signal line suitable for the aerosol generation device because the second signal line is used for the communication at a speed lower than that of the first signal line, the power supply unit can be configured to have a necessary function in the power supply unit, and the user convenience can be improved.

(4) The power supply unit for the aerosol generation device according to (3), further including:

a circuit board (the circuit board 60) on which the receptacle is mounted, in which the receptacle is configured to allow insertion of the plug at a first angle (the upside-up direction) and insertion of the plug at a second angle (the upside-down direction) rotated 180 degrees in a rolling direction from the first angle, in which the receptacle includes a first pin (the A6 pin, the A7 pin) connectable to a pin of the second signal line of the plug inserted at the first angle, and in which the receptacle includes a second pin (the B6 pin, the B7 pin) connectable to a pin of the second signal line of the plug inserted at the second angle, in which in the circuit board, the first pin and the second pin are connected in parallel, and in which the circuit board includes a protection element (the variable resistors VR2 and VR3) connected in parallel to the first pin and the second pin connected in parallel.

According to (4), since the protection element is connected in parallel to the first pin and the second pin connected in parallel in the circuit board, the system of the power supply unit can be protected from noise that may be input via these pins by a small number of protection elements as compared with a case where protection elements are individually connected to the first pin and the second pin. That is, while appropriately protecting the system of the power supply unit, it is possible to reduce the number of protection elements so as to miniaturize the power supply unit and the aerosol generation device and reduce the manufacturing cost.

(5) The power supply unit for the aerosol generation device according to (1), further including:

a circuit board (the circuit board 60) on which the receptacle is mounted, in which the receptacle includes pins (the A8 pin, the B8 pin) connectable to pins of some of signal lines among a plurality of signal lines provided in the plug, and in which the pins connectable to the pins of some of the signal lines are not connected to other elements mounted on the circuit board.

According to (5), it is possible to reduce the mounting area of the receptacle while leaving the pins connectable to the pins of some of the signal lines of the plug in consideration of the future expansion of the function of the aerosol generation device.

(6) The power supply unit for the aerosol generation device according to any one of (1) to (5), further including:

a circuit board including a first surface (the first surface 71) on which the receptacle is mounted, and a second surface (the second surface 72) that is a back surface of the first surface, or that is positioned on a back side of the first surface and on which an element (the protection IC 61) is mounted.

According to (6), since the receptacle and the element can be mounted using both the first surface and the second surface of the circuit board, the circuit board can be miniaturized.

(7) The power supply unit for the aerosol generation device according to (6), in which the element is mounted on a location of the second surface positioned on a back side in a vertical direction of a location of the first surface on which the receptacle is mounted.

According to (7), since the receptacle can be mounted in a small area, the element is mounted on the location of the second surface positioned on the back side in the vertical direction of the location of the first surface on which the receptacle is mounted, so that the circuit board can be miniaturized.

(8) The power supply unit for the aerosol generation device according to any one of (1) to (7), further including:

a circuit board (the circuit board 60) on which the receptacle is mounted and at least a part of which is L-shaped.

According to (8), since it is possible to arrange other components in the cutout portion of the circuit board having the L shape, the power supply unit can be miniaturized.

(9) The power supply unit for the aerosol generation device according to (8), further including:

a case (the power supply unit case 11) configured to house the power supply, the receptacle, the charger, and the circuit board, in which the case is configured to house the heater and the aerosol source in a cutout portion of the L-shaped circuit board.

According to (9), since the case that houses the power supply, the circuit board, and the like can house the heater and the aerosol source in the cutout portion of the L-shaped circuit board, the aerosol generation device can be miniaturized.

(10) The power supply unit for the aerosol generation device according to (8), further including:

a connector (the power supply connector 81) configured to electrically connect the power supply and the circuit board; and a controller (the MCU 50), in which the circuit board includes a first surface (the first surface 71) and a second surface (the second surface 72) that is a back surface of the first surface or is positioned on a back side of the first surface, in which some of the connector, the controller, the charger, and the receptacle are mounted on the first surface, and in which a remainder of the connector, the controller, the charger, and the receptacle is mounted on the second surface.

According to (10), since the receptacle and the elements for charging the power supply are dispersedly mounted on both the first surface and the second surface, the heat generated by the receptacle and the elements when charging the power supply can be dispersed.

(11) The power supply unit for the aerosol generation device according to (8), further including:

a connector (the power supply connector 81) configured to electrically connect the power supply and the circuit board, in which the connector and the charger are mounted on one of left and right sides when viewed from a position where the receptacle is mounted on the circuit board.

According to (11), since the connector and the charger can be integrated and mounted on the circuit board, the circuit board can be miniaturized and charging efficiency can be improved.

What is claimed is:

1. A device, comprising:
a plug;
a power supply unit for an aerosol generation device,
wherein the plug includes a plurality of pins having a predetermined pin arrangement,
wherein the power supply unit for the aerosol generation device includes:
   a power supply configured to supply power to a heater configured to heat an aerosol source;
   a receptacle configured to allow insertion of the plug and configured to receive power for charging the power supply from the inserted plug; and
   a charger configured to control charging of the power supply by power received by the receptacle,
wherein the receptacle includes pins connectable to only some of pins among the plurality of pins,
a circuit board on which the receptacle is mounted and at least a part of which is L-shaped; and
a case configured to house the power supply, the receptacle, the charger, and the circuit board,
wherein the case is configured to house the heater and the aerosol source in a cutout portion of the L-shaped circuit board.

2. The device according to claim 1,
wherein the receptacle includes pins connectable to pins of some of signal lines among a plurality of signal lines provided in the plug, and
wherein the pins connectable to the pins of some of the signal lines are not connected to other elements mounted on the circuit board.

3. The device according to claim 1, further comprising:
a connector configured to electrically connect the power supply and the circuit board; and
a controller,
wherein the circuit board includes a first surface and a second surface that is a back surface of the first surface or is positioned on a back side of the first surface,
wherein some of the connector, the controller, the charger, and the receptacle are mounted on the first surface, and
wherein a remainder of the connector, the controller, the charger, and the receptacle is mounted on the second surface.

4. The device according to claim 1, further comprising:
a connector configured to electrically connect the power supply and the circuit board,
wherein the connector and the charger are mounted on one of left and right sides when viewed from a position where the receptacle is mounted on the circuit board.

5. The device according to claim 1, further comprising:
wherein the circuit board includes a first surface on which the receptacle is mounted, and a second surface that is a back surface of the first surface, or that is positioned on a back side of the first surface and on which an element is mounted.

6. The device according to claim 5,
wherein the element is mounted on a location of the second surface positioned on a back side in a vertical direction of a location of the first surface on which the receptacle is mounted.

7. The device according to claim 1,
wherein the receptacle includes a pin connectable to a pin of a power line provided in the plug, and is configured to be unconnectable to a pin of a first signal line among a plurality of signal lines provided in the plug.

8. The device according to claim 7,
wherein the receptacle includes a pin connectable to a pin of a second signal line among the plurality of signal lines, and
wherein the second signal line is a signal line used for communication at a speed lower than that of the first signal line.

9. The device according to claim 8,
wherein the receptacle is configured to allow insertion of the plug at a first angle and insertion of the plug at a second angle rotated 180 degrees in a rolling direction from the first angle,
wherein the receptacle includes a first pin connectable to a pin of the second signal line of the plug inserted at the first angle, and
wherein the receptacle includes a second pin connectable to a pin of the second signal line of the plug inserted at the second angle,
wherein in the circuit board, the first pin and the second pin are connected in parallel, and
wherein the circuit board includes a protection element connected in parallel to the first pin and the second pin connected in parallel.

\* \* \* \* \*